(12) United States Patent
Ren et al.

(10) Patent No.: US 12,535,951 B2
(45) Date of Patent: Jan. 27, 2026

(54) SERVICE SYSTEM AND MEMORY MANAGEMENT METHOD AND APPARATUS

(71) Applicant: Huawei Technologies Co., Ltd., Shenzhen (CN)

(72) Inventors: Ren Ren, Shanghai (CN); Chuan Liu, Chengdu (CN); Yue Zhao, Shenzhen (CN); Wenlin Cui, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/600,126

(22) Filed: Mar. 8, 2024

(65) Prior Publication Data

US 2024/0211136 A1 Jun. 27, 2024

Related U.S. Application Data

(63) Continuation of application No. PCT/CN2022/096400, filed on May 31, 2022.

(30) Foreign Application Priority Data

Sep. 11, 2021 (CN) .......................... 202111064929.7
Sep. 30, 2021 (CN) .......................... 202111165165.0

(51) Int. Cl.
*G06F 3/06* (2006.01)

(52) U.S. Cl.
CPC ............ *G06F 3/061* (2013.01); *G06F 3/0631* (2013.01); *G06F 3/0673* (2013.01)

(58) Field of Classification Search
None
See application file for complete search history.

(56) References Cited

U.S. PATENT DOCUMENTS

| 5,093,913 A | 3/1992 | Bishop et al. |
| 9,652,150 B2 | 5/2017 | Tan et al. |
| 2010/0085870 A1* | 4/2010 | Barsness ............. G06F 11/1438 370/221 |

FOREIGN PATENT DOCUMENTS

| CN | 108139969 B | 6/2021 | |
| CN | 113204407 A | 8/2021 | |
| WO | WO-2011060366 A2 * | 5/2011 | ........... G06F 12/084 |

* cited by examiner

*Primary Examiner* — Brian R Peugh
(74) *Attorney, Agent, or Firm* — Slater Matsil, LLP

(57) ABSTRACT

A service system and a memory management method and apparatus are provided. The service system includes a plurality of service nodes. A memory of at least one of the plurality of service nodes is divided into a local resource and a global resource. The local resource is used to provide memory storage space for a local service node, the global resource of the at least one service node forms a memory pool, and the memory pool is used to provide memory storage space for the plurality of service nodes. When a specific condition is satisfied, at least a part of space in the local resource is transferred to the memory pool.

20 Claims, 22 Drawing Sheets

TO FIG. 11(b)

SERVICE SYSTEM AND MEMORY MANAGEMENT METHOD AND APPARATUS

CROSS-REFERENCE TO RELATED APPLICATIONS

This application is a continuation of International Application No. PCT/CN2022/096400, filed on May 31, 2022, which claims priority to Chinese Patent Application No. 202111165165.0 filed on Sep. 30, 2021 and Chinese Patent Application No. 202111064929.7, filed on Sep. 11, 2021. All of the aforementioned patent applications are hereby incorporated by reference in their entireties.

TECHNICAL FIELD

This application relates to the computer field, and in particular, to a service system and a memory management method and apparatus.

BACKGROUND

With development of high-speed networks and new memory technologies, memory resource pooling gradually becomes a new development trend. For example, in a service system, memory resources of a plurality of service nodes may be used to construct a global memory resource pool, and the service nodes can share the memory resources in the global memory resource pool.

Compared with a technical solution in which each service node independently uses memory resources of the service node, the foregoing technical solution for constructing the global memory resource pool can balance load of the memory resources of the service nodes, but still has some problems.

For example, in the foregoing technical solution for constructing the global memory resource pool, to avoid a conflict that occurs when the service nodes access data in the global memory resource pool, that accessed data in the global memory resource pool is not simultaneously accessed by two applications needs to be ensured. This causes losses in memory performance and costs. For another example, a communication delay between service nodes affects a memory access speed, and a memory performance advantage cannot be brought into full play.

SUMMARY

This application provides a service system, a memory management method and apparatus, to resolve a problem of deterioration in memory performance.

To achieve the foregoing objective, the following technical solutions are used in this application.

According to a first aspect, a service system is provided. The service system includes a plurality of service nodes. A memory of at least one of the plurality of service nodes is divided into a local resource and a global resource. The local resource is used to provide memory storage space for a local service node, the global resource of the at least one service node forms a memory pool, and the memory pool is used to provide memory storage space for the plurality of service nodes. When a specific condition is satisfied, at least a part of space in the local resource is transferred to the memory pool, or at least a part of space in the memory pool is transferred to the local resource. In actual application, a name of the memory pool may be arbitrarily set depending on an actual requirement. For example, the memory pool may also be referred to as a memory resource pool, a global memory resource pool, or the like. This is not limited in this application.

In the method of this application, the memory pool that can be used by all service nodes in the service system is constructed, to balance load of the service nodes. In addition to the global resource, the service node further includes the local resource, and each service node does not conflict with other service nodes when accessing the local resource. Therefore, each service node may load data to the local resource, to avoid a conflict with other service nodes, thereby reducing losses in memory performance and costs. Moreover, because each service node may load data to the local resource, an access speed of accessing the local resource by the service node is not affected by a communication delay between service nodes.

In a possible design, the service system further includes a memory management apparatus. The memory management apparatus is configured to adjust storage space sizes of a local resource and a global resource of each of the at least one service node.

In the foregoing design, the memory management apparatus may control the storage space sizes of the local resource and the global resource, so that more memory resources can be allocated to the local resource when a requirement for the local resource is large, and more memory resources can be allocated to the global resource when a requirement for the global resource is large. In this way, memory resources are allocated more properly and system performance is improved.

In a possible design, that the memory management apparatus is configured to adjust storage space sizes of a local resource and a global resource of each of the at least one service node specifically includes at least one of the following: The memory management apparatus is configured to: when the global resource of the at least one service node is exhausted and the local resource of the at least one service node has free space, transfer the free space in the local resource of the at least one service node to the global resource of the at least one service node. Alternatively, the memory management apparatus is configured to: when the local resource of the at least one service node is exhausted and the global resource of the at least one service node has free space, transfer the free space in the global resource of the at least one service node to the local resource of the at least one service node. Alternatively, the memory management apparatus is configured to: when both the global resource and the local resource of the at least one service node are exhausted, reclaim a memory resource of lowest value in the memory of the at least one service node, and transfer the reclaimed memory resource to the global resource or transfer the reclaimed memory resource to the local resource.

In the foregoing design, when the global resource is exhausted, the free space in the local resource is transferred to the global resource, and when the local resource is exhausted, the free space in the global resource is transferred to the local resource. In this way, a balance in resource allocation is achieved between the local resource and the global resource, to allocate memory resources more properly and improve system performance. In addition, when both the global resource and the local resource are exhausted, in the foregoing design, the memory resource of the lowest value in the memory may be reclaimed, and the reclaimed memory resource may be transferred to the global resource or the local resource, to improve system performance.

In a possible design, the memory management apparatus is further configured to: when adjusting the storage space sizes of the local resource and the global resource of each of the at least one service node, keep the storage space size of the local resource of each of the at least one service node not less than a preset threshold.

In the foregoing design, in a running process, the service node usually still needs to load data to the local resource in the memory, so that the local service node quickly accesses the data. Therefore, at least a part of memory resources are retained for the local resource, to ensure that the service node quickly accesses the data.

In a possible design, the memory management apparatus is further configured to determine, from the local resource or the global resource of the at least one service node based on accessed information of first data, a memory resource for loading the first data.

The accessed information of the first data may include various types of information used to reflect a quantity of times or a frequency of accessing target data by each service node.

In the foregoing design, a proper memory resource may be allocated to the first data based on the accessed information of data (namely, the first data). For example, if it is determined, based on the accessed information of the first data, that the first data has been previously accessed by only one service node, the first data is loaded to a local resource of the service node, so that the service node can quickly access the first data in subsequent processing, and a conflict with other service nodes when the service node accesses the first data is avoided. If it is determined, based on the accessed information of the first data, that the first data has been previously accessed by a plurality of service nodes, the first data may be loaded to the global resource, so that the plurality of service nodes can access the first data in subsequent processing.

In a possible design, that the memory management apparatus is configured to determine, from the local resource or the global resource of the at least one service node based on accessed information of first data, a memory resource for loading the first data includes: The memory management apparatus is configured to determine to load the first data to the global resource of the at least one service node if determining, based on the accessed information of the first data, that the first data has been accessed by m service nodes, where m is a positive integer greater than 1, and the m service nodes are included in the plurality of service nodes.

In the foregoing design, when it is determined that the first data has been accessed by a plurality of service nodes, the first data is loaded to the global resource, so that the plurality of service nodes can access the first data by using the global resource in subsequent processing.

In a possible design, that the memory management apparatus is configured to determine to load the first data to the global resource of the at least one service node if determining, based on the accessed information of the first data, that the first data has been accessed by m service nodes includes: The memory management apparatus is configured to: if determining, based on the accessed information of the first data, that the first data has been accessed by the m service nodes, determine, based on an affinity between the first data and each of the m service nodes, to load the first data to the global resource of the at least one service node.

In the foregoing design, the first data may be loaded to a global resource of a service node that has a higher affinity with the first data, so that usage efficiency of the memory pool is higher.

In a possible design, that the memory management apparatus is configured to determine, from the local resource or the global resource of the at least one service node based on accessed information of first data, a memory resource for loading the first data includes: The memory management apparatus is configured to: if determining, based on the accessed information of the first data, that the first data has been accessed by the at least one service node, determine to load the first data to the local resource of the at least one service node.

In the foregoing design, when it is determined that the first data is accessed by a service node, the first data is loaded to a local resource of the service node, so that the service node can quickly access the first data in subsequent running.

In a possible design, that the memory management apparatus is configured to determine, from the local resource or the global resource of the at least one service node based on accessed information of first data, a memory resource for loading the first data includes: The memory management apparatus is configured to: if determining, based on the accessed information of the first data, that the first data has been accessed by m service nodes and an affinity between n service nodes in the m service nodes and the first data is greater than an affinity threshold, determine to load the first data to a local resource of the n service nodes, where m is a positive integer greater than 1, n is a positive integer less than or equal to m, and the m service nodes are included in the plurality of service nodes.

In the foregoing design, when it is determined that the affinity between the first data and the n service nodes is close, the first data may be loaded to the local resource of the n service nodes, so that the n service nodes can quickly access the first data in subsequent running.

In a possible design, the first data has an access parameter, and the access parameter indicates whether data copies of the first data in memories of the plurality of service nodes are available. The memory management apparatus is further configured to obtain a read request for the first data; determine the access parameter corresponding to the first data, where the access parameter indicates whether the data copies of the first data in the memories of the plurality of service nodes are available; and obtain the first data from the memories of the plurality of service nodes or storage locations in the plurality of service nodes other than the memories based on the access parameter.

In the foregoing design, an access parameter is set, and the access parameter can indicate whether the data copies of the data in the memories are available. For example, when a service node writes new data content into target data, an access parameter of the target data is set to an "unavailable" state, and the access parameter of the target data is set to an "available" state only after invalidation processing is performed on data copies of the target data recorded in the memory of each service node. In this way, when accessing the target data in the memory, the service node may first obtain the access parameter corresponding to the target data, and determine, based on the access parameter, whether the data copies of the target data recorded in the memory are available. If the access parameter indicates an "available" state, the data-copy data of the target data in the memory is read. If the access parameter indicates an "unavailable" state, the memory may be bypassed, and the target data may be read from a hard disk.

In a possible design, the memory management apparatus is further configured to: when the first data changes, perform a preset operation on the access parameter, so that the access parameter indicates that the data copies that are of the data corresponding to the access parameter and that are in the memories of the plurality of service nodes are unavailable. For example, the preset operation may be increasing or decreasing a preset value.

In a possible design, the memory management apparatus is further configured to: after invalidation processing or reloading performed on the data copies of the first data is completed, perform an inverse operation of the preset operation on the access parameter.

In the foregoing design, when the first data changes, the preset operation is performed on the access parameter, to change a value of the access parameter, so that the value of the access parameter indicates that the first data in the memories is unavailable. In addition, after invalidation processing or reloading performed on the data copies of the first data in the memories is completed, the inverse operation is performed on the access parameter, so that the access parameter is restored to a previous state. After the access parameter is restored to the state indicating that the data copies are available, the data-copy data of the first data may be obtained from the memories in a subsequent access process.

In a possible design, the performing a preset operation on the access parameter includes: performing the preset operation on the access parameter according to a compare-and-swap CAS mechanism.

In the foregoing design, performing the preset operation on the access parameter according to the CAS mechanism can ensure atomicity of performing the preset operation on the access parameter each time. For example, when a plurality of service nodes simultaneously modify the access parameter, because the CAS mechanism is used, the service nodes successively modify the access parameter in sequence, and no interference is caused between the service nodes.

According to a second aspect, this application provides a memory management method. The method is applied to a service system, the service system includes a plurality of service nodes, and the method includes: dividing a memory of at least one of the plurality of service nodes into a local resource and a global resource, where the local resource is used to provide memory storage space for a local service node, the global resource of the at least one service node forms a memory pool, the memory pool is used to provide memory storage space for the plurality of service nodes, and when a specific condition is satisfied, at least a part of space in the local resource is transferred to the memory pool, or at least a part of space in the memory pool is transferred to the local resource; and adjusting storage space sizes of the local resource and the global resource of the at least one service node.

In a possible design, the adjusting storage space sizes of the local resource and the global resource of the at least one service node specifically includes at least one of the following: when the global resource of the at least one service node is exhausted and the local resource of the at least one service node has free space, transferring the free space in the local resource of the at least one service node to the global resource of the at least one service node; when the local resource of the at least one service node is exhausted and the global resource of the at least one service node has free space, transferring the free space in the global resource of the at least one service node to the local resource of the at least one service node; or when both the global resource and the local resource of the at least one service node are exhausted, reclaiming a memory resource of lowest value in the memory of the at least one service node, and transferring the reclaimed memory resource to the global resource or transferring the reclaimed memory resource to the local resource.

In a possible design, the method further includes: when storage space sizes of a local resource and a global resource of each of the at least one service node are adjusted, keeping the storage space size of the local resource of each of the at least one service node not less than a preset threshold.

In a possible design, the method further includes: determining, from the local resource or the global resource of the at least one service node based on accessed information of first data, a memory resource for loading the first data.

In a possible design, the determining, from the local resource or the global resource of the at least one service node based on accessed information of first data, a memory resource for loading the first data includes: determining to load the first data to the global resource of the at least one service node if determining, based on the accessed information of the first data, that the first data has been accessed by m service nodes, where m is a positive integer greater than 1, and the m service nodes are included in the plurality of service nodes.

In a possible design, the determining to load the first data to the global resource of the at least one service node if determining, based on the accessed information of the first data, that the first data has been accessed by m service nodes includes: if determining, based on the accessed information of the first data, that the first data has been accessed by the m service nodes, determining, based on an affinity between the first data and each of the m service nodes, to load the first data to the global resource of the at least one service node.

In a possible design, the determining, from the local resource or the global resource of the at least one service node based on accessed information of first data, a memory resource for loading the first data includes: if determining, based on the accessed information of the first data, that the first data has been accessed by the at least one service node, determining to load the first data to the local resource of the at least one service node.

In a possible design, the determining, from the local resource or the global resource of the at least one service node based on accessed information of first data, a memory resource for loading the first data includes: if determining, based on the accessed information of the first data, that the first data has been accessed by m service nodes and an affinity between n service nodes in the m service nodes and the first data is greater than an affinity threshold, determining to load the first data to a local resource of the n service nodes, where m is a positive integer greater than 1, n is a positive integer less than or equal to m, and the m service nodes are included in the plurality of service nodes.

In a possible design, the first data has an access parameter, and the access parameter indicates whether data copies of the first data in memories of the plurality of service nodes are available. The method further includes: obtaining a read request for the first data; determining the access parameter corresponding to the first data, where the access parameter indicates whether the data copies of the first data in the memories of the plurality of service nodes are available; and obtaining the first data from the memories of the plurality of service nodes or storage locations in the plurality of service nodes other than the memories based on the access parameter.

In a possible design, the method further includes: when the first data changes, performing a preset operation on the access parameter, so that the access parameter indicates that the data copies that are of the data corresponding to the access parameter and that are in the memories of the plurality of service nodes are unavailable.

In a possible design, the method further includes: after invalidation processing or reloading performed on the data copies of the first data is completed, performing an inverse operation of the preset operation on the access parameter.

In a possible design, the performing a preset operation on the access parameter includes: performing the preset operation on the access parameter according to a compare-and-swap CAS mechanism.

According to a third aspect, a memory management apparatus is provided. The memory management apparatus is located in a service system, and the service system includes a plurality of service nodes. The memory management apparatus includes: a resource division unit, configured to divide a memory of at least one of the plurality of service nodes into a local resource and a global resource, where the local resource is used to provide memory storage space for a local service node, the global resource of the at least one service node forms a memory pool, the memory pool is used to provide memory storage space for the plurality of service nodes, and when a specific condition is satisfied, at least a part of space in the local resource is transferred to the memory pool, or at least a part of space in the memory pool is transferred to the local resource; and a resource adjustment unit, configured to adjust storage space sizes of the local resource and the global resource of the at least one service node.

In a possible design, the resource adjustment unit is specifically configured to: when the global resource of the at least one service node is exhausted and the local resource of the at least one service node has free space, transfer the free space in the local resource of the at least one service node to the global resource of the at least one service node. Alternatively, the resource adjustment unit is specifically configured to: when the local resource of the at least one service node is exhausted and the global resource of the at least one service node has free space, transfer the free space in the global resource of the at least one service node to the local resource of the at least one service node. Alternatively, the resource adjustment unit is specifically configured to: when both the global resource and the local resource of the at least one service node are exhausted, reclaim a memory resource of lowest value in the memory of the at least one service node, and transfer the reclaimed memory resource to the global resource or transfer the reclaimed memory resource to the local resource.

In a possible design, the resource adjustment unit is further configured to: when adjusting storage space sizes of a local resource and a global resource of each of the at least one service node, keep the storage space size of the local resource of each of the at least one service node not less than a preset threshold.

In a possible design, the memory management apparatus further includes a memory allocation unit. The memory allocation unit is configured to determine, from the local resource or the global resource of the at least one service node based on accessed information of first data, a memory resource for loading the first data.

In a possible design, that the memory allocation unit is configured to determine, from the local resource or the global resource of the at least one service node based on accessed information of first data, a memory resource for loading the first data includes: The memory allocation unit is configured to determine to load the first data to the global resource of the at least one service node if determining, based on the accessed information of the first data, that the first data has been accessed by m service nodes, where m is a positive integer greater than 1, and the m service nodes are included in the plurality of service nodes.

In a possible design, that the memory allocation unit is configured to determine to load the first data to the global resource of the at least one service node if determining, based on the accessed information of the first data, that the first data has been accessed by m service nodes includes: The memory allocation unit is specifically configured to: if determining, based on the accessed information of the first data, that the first data has been accessed by the m service nodes, determine, based on an affinity between the first data and each of the m service nodes, to load the first data to the global resource of the at least one service node.

In a possible design, that the memory allocation unit is configured to determine, from the local resource or the global resource of the at least one service node based on accessed information of first data, a memory resource for loading the first data includes: The memory allocation unit is configured to: if determining, based on the accessed information of the first data, that the first data has been accessed by the at least one service node, determine to load the first data to the local resource of the at least one service node.

In a possible design, that the memory allocation unit is configured to determine, from the local resource or the global resource of the at least one service node based on accessed information of first data, a memory resource for loading the first data includes: The memory allocation unit is specifically configured to: if determining, based on the accessed information of the first data, that the first data has been accessed by m service nodes and an affinity between n service nodes in the m service nodes and the first data is greater than an affinity threshold, determine to load the first data to a local resource of the n service nodes, where m is a positive integer greater than 1, n is a positive integer less than or equal to m, and the m service nodes are included in the plurality of service nodes.

In a possible design, the first data has an access parameter, and the access parameter indicates whether data copies of the first data in memories of the plurality of service nodes are available. The memory management apparatus further includes a read/write unit. The read/write unit is configured to obtain a read request for the first data; the read/write unit is further configured to determine the access parameter corresponding to the first data, where the access parameter indicates whether the data copies that are of the data corresponding to the access parameter and that are in the memories of the plurality of service nodes are available; and the read/write unit is further configured to obtain the first data from the memories of the plurality of service nodes or storage locations in the plurality of service nodes other than the memories based on the access parameter.

In a possible design, the read/write unit is further configured to: when the first data changes, perform a preset operation on the access parameter, so that the access parameter indicates that the data copies that are of the data corresponding to the access parameter and that are in the memories of the plurality of service nodes are unavailable.

In a possible design, the read/write unit is further configured to: after invalidation processing or reloading performed on the data copies of the first data is completed, perform an inverse operation of the preset operation on the access parameter.

In a possible design, the performing a preset operation on the access parameter includes: performing the preset operation on the access parameter according to a compare-and-swap CAS mechanism.

According to a fourth aspect, a memory management apparatus is provided, including a processor and a communication interface. The processor receives or sends data through the communication interface, and the processor is configured to implement functions of the memory management apparatus in the method according to any one of the second aspect or the designs of the second aspect.

According to a fifth aspect, a computer-readable storage medium is provided. The storage medium stores a computer program. When the computer program is executed by a processor, functions of the memory management apparatus in the method according to any one of the second aspect or the designs of the second aspect are implemented.

According to a sixth aspect, a computer program product is provided. The computer program product includes instructions. When the instructions are run on a processor, functions of the memory management apparatus in the method according to any one of the second aspect or the designs of the second aspect are implemented.

For beneficial effects of the second aspect to the sixth aspect, refer to the beneficial effects of the first aspect and the designs of the first aspect. Details are not described herein again.

DETAILED DESCRIPTION OF ILLUSTRATIVE EMBODIMENTS

The following describes technical solutions in embodiments with reference to the accompanying drawings.

A system architecture and a service scenario that are described in embodiments are intended to describe the technical solutions in embodiments more clearly, and do not constitute any limitation on the technical solutions provided in embodiments. A person of ordinary skill in the art can be aware that, as the system architecture evolves and a new service scenario emerges, the technical solutions provided in embodiments are also applicable to similar technical issues.

Figure 1:
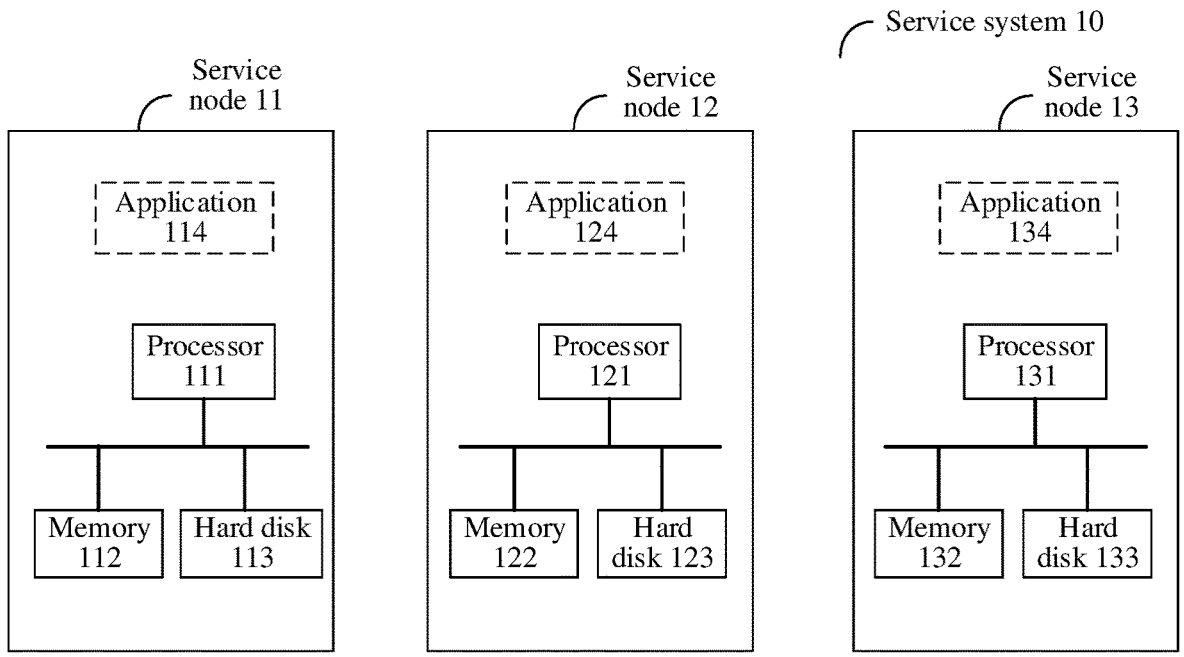
FIG. 1 is a schematic diagram 1 of a structure of a service system according to this application.

FIG. 1 is a schematic diagram of a system architecture of a service system according to an embodiment. The service system 10 includes one or more service nodes (three service nodes: a service node 11, a service node 12, and a service node 13, are listed in FIG. 1 as an example). The service nodes may be specifically various hardware devices having data processing and storage functions, such as a server, a desktop computer, and a controller of a storage array.

In terms of hardware, each service node includes a processor, a memory, and a hard disk. For example, in FIG. 1, the service node 11 includes a processor 111, a memory 112, and a hard disk 113, the service node 12 includes a processor 121, a memory 122, and a hard disk 123, and the service node 13 includes a processor 131, a memory 132, and a hard disk 133.

The service node 11 is used as an example. The processor 111 may be one or more devices, circuits, and/or processing cores for processing data (for example, computer program instructions). Specifically, the processor 111 is configured to execute computer instructions, to process data generated in the service node 11. Specifically, the processor 11 may include a central processing unit (CPU), and the processor 11 may further include a microprocessor, a field programmable gate array (FPGA), a digital signal processor (DSP), an application-specific integrated circuit (ASIC), another programmable logic device, a discrete gate, a transistor logic device, a discrete hardware component, and the like. In an example, only one processor is shown in each service node in FIG. 1, to facilitate example descriptions. It can be understood that in a specific implementation process, the service node may alternatively include a plurality of processors. Each processor may be a single-core processor (single-CPU), or may be a multi-core processor (multi-CPU).

The memory 112 can be understood as storage space for directly exchanging data with the processor 111. The memory 112 can read and write data fast at any time, and can be used as a temporary data memory for an operating system or other running programs. The memory 112 may include one or more types of memories. For example, the memory may be a random access memory or a read-only memory (ROM). For example, the random access memory may be a dynamic random access memory (DRAM), a storage class memory (SCM), or a static random access memory (SRAM). The DRAM is a semiconductor memory, and is a volatile memory device like most random access memories (RAMs). The SCM uses a composite storage technology that combines features of both a conventional storage apparatus and a memory. The storage class memory can provide a faster read/write speed than a hard disk, but has a slower access speed than the DRAM, and has lower costs than the DRAM. For example, the read-only memory may be a programmable read-only memory (PROM) or an erasable programmable read-only memory (EPROM). Alternatively, the memory may be a double in-line memory module or a dual in-line memory module (DIMM for short), that is, a module including a dynamic random access memory (DRAM).

The hard disk 113 is a memory configured to persistently store data. Compared with the memory 112, a data read/write speed of the hard disk 113 is slower than that of the memory 112. One or more hard disks 113 may be disposed inside the service node 11, or a disk enclosure may be mounted outside the service node 11 and a plurality of hard disks 113 are disposed in the disk enclosure. Regardless of deployment manners, these hard disks may be considered as hard disks included in the service node 11. The hard disk 113 may specifically include a solid state disk, a hard disk drive, or another type of hard disk.

It can be understood that in some application scenarios, the hard disk 113 may also have a memory interface, so that the processor 111 can directly access the hard disk 113. In these application scenarios, some or all storage resources in the hard disk 113 may also be used as a part of the memory 112. For example, the hard disk 113 may be a persistent memory having a byte access interface. The processor 111 can directly access storage resources in the hard disk 113 through the byte access interface. In this case, some or all storage resources in the hard disk 113 may be used as a part of the memory 112, to expand memory storage space of the service node 11.

In terms of software, in the service system 10, an application program (application for short) for implementing a corresponding service function is run on each service node. For example, in FIG. 1, an application 114 is run on the service node 11, an application 124 is run on the service node 12, and an application 134 is run on the service node 13. Specifically, an application that is run on each service node may be a database application.

In a possible design, in the service system 10, a local hardware resource inside each service node may be used to implement a function of an application. For example, on the service node 11, these pieces of hardware, namely, the processor 111, the memory 112, and the hard disk 113, are used to implement a function of the application 114. In this case, the service nodes are independent of each other and process respective data. Processed results may be summarized to an upper-layer application or transferred between service nodes. In the foregoing design, because each application is independently run on a local hardware resource of a single service node, a load imbalance problem may exist. As a result, hardware resources of the service nodes cannot be efficiently used.

Figure 2:
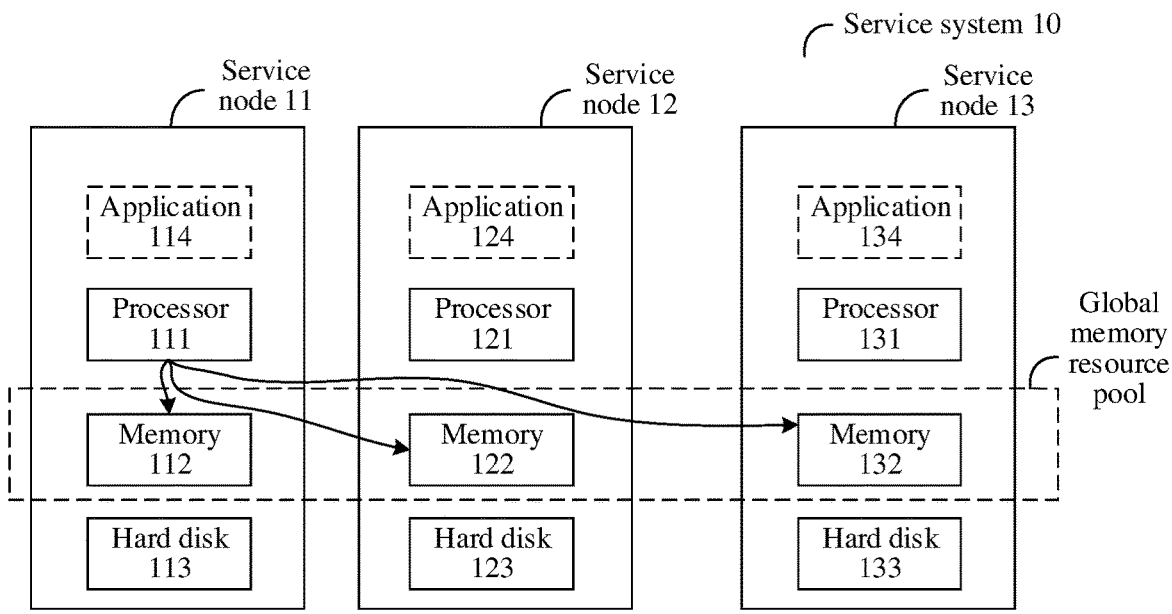
FIG. 2 is a schematic diagram 2 of a structure of a service system according to this application.

In another possible design, to avoid a load imbalance problem between the service nodes in the service system 10, as shown in FIG. 2, in the service system 10, data computing resources (that is, processors of the service nodes) and memory resources (that is, memories of the service nodes) in the service system 10 are decoupled, and memory resources of a plurality of service nodes in the service system 10 are used to construct a global memory resource pool. The service nodes can share resources in the global memory resource pool. In this way, memory load of the services nodes can be balanced.

In the foregoing design, to avoid a conflict that occurs when different service nodes access the global memory resource pool, that accessed data in the global memory resource pool cannot simultaneously be accessed by two applications needs to be ensured. To achieve this objective, generally, access operations performed by the service nodes on the data in the global memory resource pool may be kept independent without mutual interference. However, this manner limits a parallel processing capability of the global memory resource pool, thereby causing losses in performance and costs. In addition, because the global memory resource pool involves the plurality of service nodes, for a service node in the service system, data to be accessed by the service node may be stored in a local memory of the service node, or may be stored in a memory of another service node. When the data is stored in the memory of the another service node, the service node has to access the another service node. Therefore, a communication delay between service nodes greatly affects performance of the global memory resource pool.

To avoid problems that a parallel processing capability is poor and a communication delay between service nodes affects memory performance when the service nodes share the global memory resource pool, an embodiment provides a technical solution. In this technical solution, memory resources of a service node are divided into two parts. For ease of description, the two parts are referred to as a "local resource" and a "global resource" below. A local resource refers to memory storage space that is of a service node and that is dedicated to the service node. A global resource refers to memory storage space that is of a service node, that is provided for a global memory resource pool, and that can be shared by the service node or other service nodes.

Figure 3A:
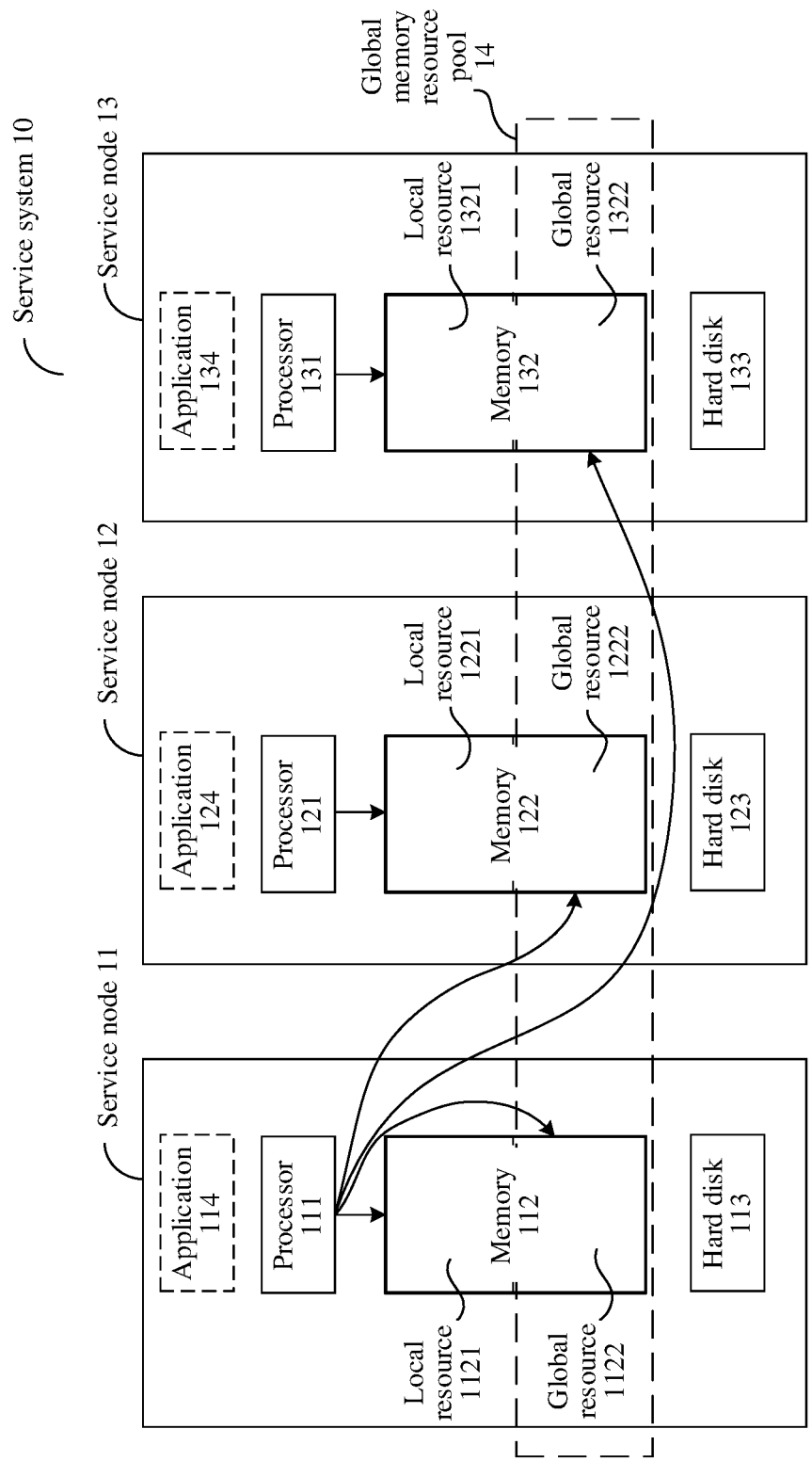
FIG. 3A is a schematic diagram 3 of a structure of a service system according to this application.

For example, as shown in FIG. 3A, the memory 112 of the service node 11 is divided into two parts: a local resource 1121 and a global resource 1122. Likewise, the memory 122 of the service node 12 is divided into a local resource 1221 and a global resource 1222, and the memory 132 of the service node 12 is divided into a local resource 1321 and a global resource 1322.

It should be noted that in this embodiment, in a process of dividing memory resources of a service node into two parts, in an implementation, a physical division manner may be used. For example, in a service node, a plurality of memories (the memories may be memories of different types or of a same type such as a DRAM, an SCM, or a hard disk) form a memory. Storage space of some memories may be used as a local resources, and storage space of the other memories may be used as a global resource. In another implementation, a logical division manner may be used. For example, storage space in a memory of a service node may be divided into two parts based on a logical address corresponding to the storage space. One part is used as a local resource, and the other part is used as a global resource. This may not be limited in this embodiment.

In this technical solution, global resources of a plurality of service nodes may form a global memory resource pool. The service nodes in the service system can share resources in the global memory resource pool. As shown in FIG. 3A, the global resource 1122, the global resource 1222, and the global resource 1322 form a global memory resource pool 14, and the service nodes in the service system 10 share resources in the global memory resource pool 14.

Unified addressing needs to be performed on storage space included in the global memory resource pool 14. After the unified addressing is performed, each segment of (specific) space of the global memory resource pool 14 has a unique global address. For the space herein, a "page (page)" may be used to represent a minimum access granularity of the global memory resource pool 14. The global address is a unique address of storage space indicated by the address in the global memory resource pool 14, and each service node can know a meaning of the address. After physical space is allocated to a segment of space in the global memory resource pool, a global address of the space has a corresponding physical address. The physical address indicates a specific memory of a specific service node on which the space indicated by the global address is actually located and an offset of the space in the memory, that is, a location of the physical space. With global addresses, as shown in FIG. 3A, in a running process of the service node 11, the processor 111 may access, by using a global address of each segment of space in the global memory resource pool 14, data stored in the global memory resource pool 14. Specifically, if the to-be-accessed data is specifically located in the global resource 1222, the processor 111 may implement one-side access to the global resource 1222 by using remote direct memory access (remote direct memory access, RDMA), compute express link (compute express link, CXL), or another technology. The one-side access may mean that, when the processor 121 of the service node 12 is unaware of the access, a network adapter (not shown in the figure) of the service node 12 quickly accesses the global resource 1222.

In addition, different from the memory resources in the global memory resource pool 14, a local resource of each service node is mainly used to support access of the local service node.

For example, in FIG. 3A, the local resource 1121 is used to provide storage space for a processor (namely, the processor 111) of a local service node (namely, the service node 11) to process data in the running process of the local service node. The local resource does not include the global address described above.

In an example, when the processor 111 of the service node 11 needs to access the local resource 1121, the processor 111 may directly access data in the local resource 1121 in a conventional manner of accessing the local memory.

In another example, because the local resource 1121 is independent of the global memory resource pool 14, a remote service node cannot access the local resource 1121 by using a global address. If the remote node needs to access data in the local resource 1121, a remote procedure call (RPC) manner or the like needs to be used. The remote service node sends an access request to a program on the service node 11, and the program on the service node 11 accesses the data in the local resource 1121 and then feeds back the data to the remote node. In this manner, essentially, the local service node (namely, the service node 11) completes access to the local resource 1121.

In other words, in this technical solution provided in this embodiment, memory resources of a service node are divided into two parts.

A part of memory the resources, namely, a global resource, are used to construct a global memory resource pool that can be used by all service nodes in the service system, so that the global resource can be directly accessed by remote service nodes in the service system. For example, a remote service node may implement direct access to the global resource of the local service node by using RDMA, CXL, or another technology when the processor of the local service node is unaware of the access.

The other part of the memory resources, namely, a local resource, are not used as a part of the global memory resource pool, and are used to support data processing performed by the local service node (for example, provide caches for the processor of the local service node). When a remote node needs to access the local resource, the remote node needs to invoke the program on the local service node to access the local resource, and then the program feeds back an access result to the remote node.

In this way, in the foregoing technical solution, the global memory resource pool that can be used by all the service nodes in the service system is constructed, to balance load of the service nodes. In addition to the global resource, each service node further includes the local resource, and each service node does not conflict with other service nodes when accessing the local resource. Therefore, each service node may load data to the local resource, to avoid a conflict with other service nodes, thereby reducing losses in memory performance and costs. Moreover, because each service node may load data to the local resource, an access speed of accessing the local resource by the service node is not affected by a communication delay between service nodes.

It should be noted that FIG. 3A merely provides an example system architecture to which this technical solution provided in this embodiment can be applied. In an actual application process, this technical solution provided in this embodiment can also be applied to other system architectures.

Figure 3B:
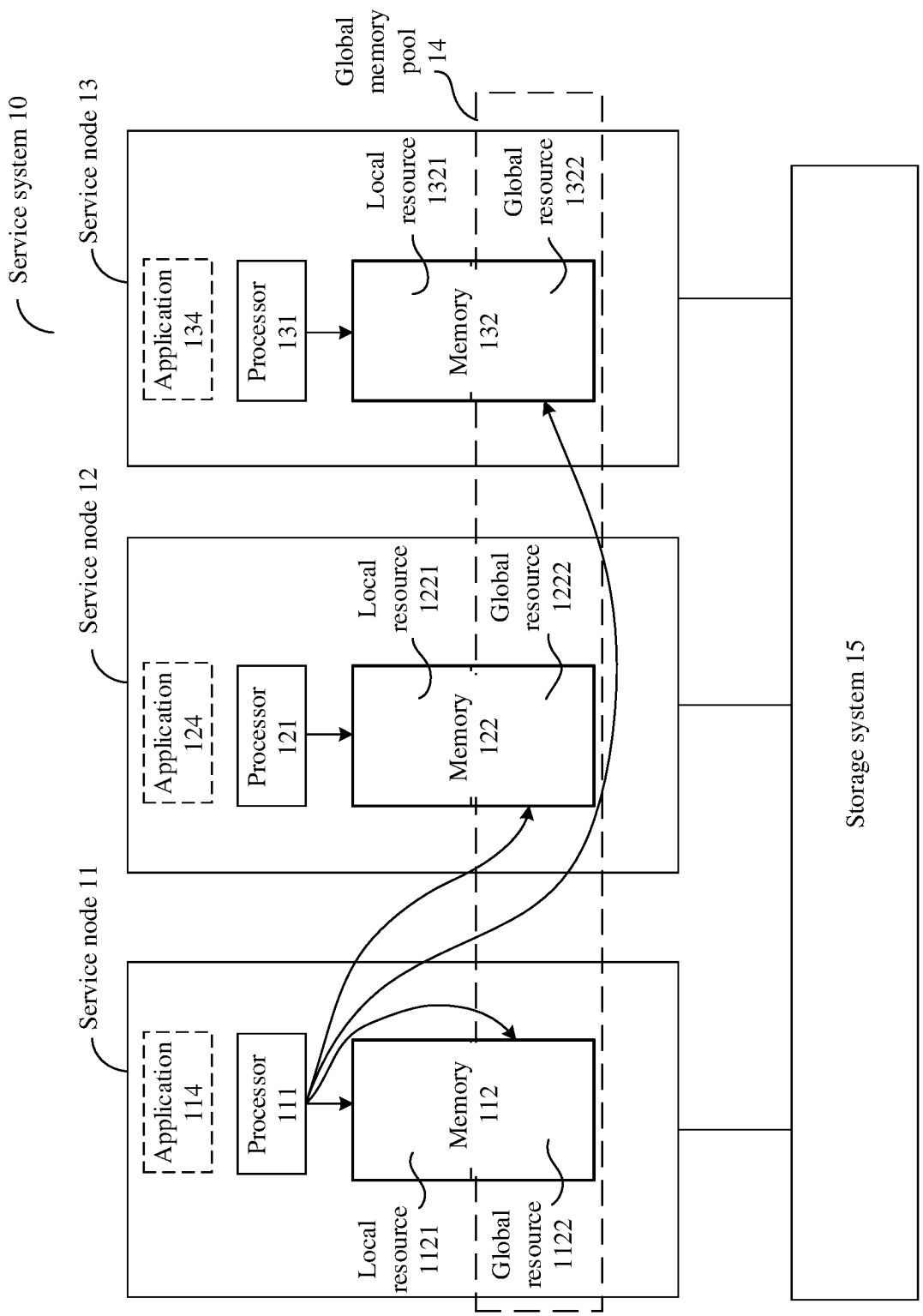
FIG. 3B is a schematic diagram 4 of a structure of a service system according to this application.

For example, in some application scenarios, as shown in FIG. 3B, the service system 10 further includes a storage system 15. In FIG. 3A, persistent storage data is stored in the hard disks (namely, the hard disk 113, the hard disk 123, and the hard disk 133 in FIG. 3A) of the service nodes. In contrast, in the service system 10 shown in FIG. 3B, the storage system 15 may be used to persistently store various types of data needed by the service nodes to run the applications. Specifically, the storage system 15 may be connected to the service nodes through various transmission networks, to implement data exchange between the service nodes and the storage system 15.

In an actual application process, the storage system 15 may be a centralized storage system, that is, the storage system 15 may be a central node including one or more storage devices, and data is jointly stored in the central node. Alternatively, the storage system 15 may be a distributed storage system including a plurality of independent storage nodes. An architecture of the storage system 15 may not be limited in this embodiment.

Figure 4:
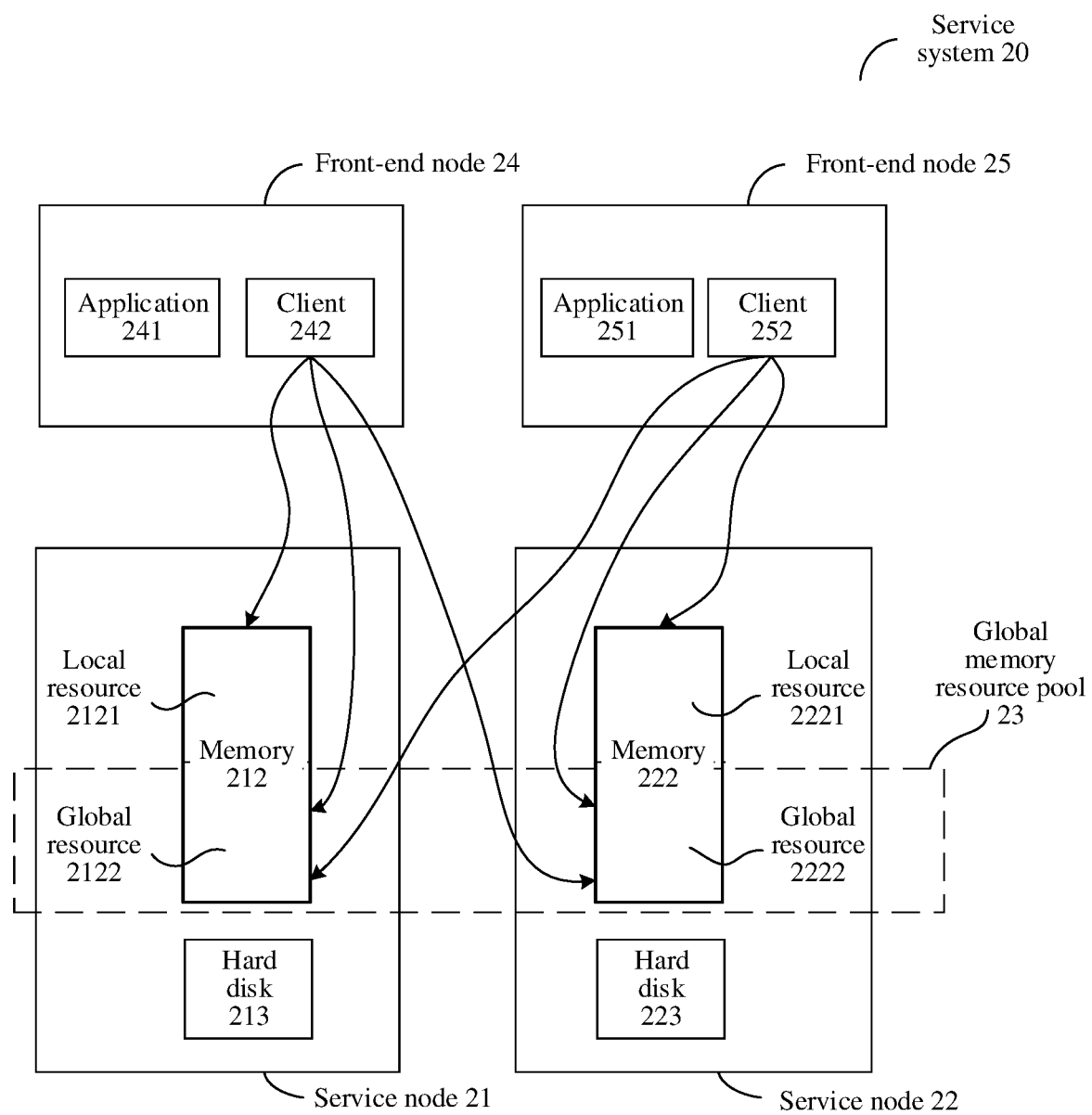
FIG. 4 is a schematic diagram 5 of a structure of a service system according to this application.

For another example, FIG. 4 is a schematic diagram of a structure of another system architecture according to an embodiment. A service system 20 includes one or more front-end nodes (for example, a front-end node 25 and a front-end node 26 in FIG. 4) and one or more service nodes (for example, a service node 21 and a service node 22 in FIG. 4).

Each front-end node includes hardware components such as a processor and a memory (not shown in the figure). Applications (for example, an application 241 and an application 251 in FIG. 4) for implementing service functions and clients (for example, a client 242 and a client 252 in FIG. 4) configured to support data exchange between the applications and the service nodes are run on the front-end nodes.

The service node 21 and the service node 22 respectively include a memory 212 and a memory 222 that provide memory storage space for the front-end nodes, and a hard disk 213 and a hard disk 223 that are configured to persistently store data.

Similar to the memory 112, the memory 122, and the memory 132 in FIG. 3A, the memory 212 and the memory 222 may be divided into local resources (for example, a local resource 2121 and a local resource 2221 in FIG. 4) and global resources (for example, a global resource 2122 and a global resource 2222 in FIG. 4). The local resource is used to specially provide memory storage space for a front-end node, and the global resource is used to construct a global memory resource pool 23 to share memory storage space by a plurality of front-end nodes.

The service node 21 is used as an example. The local resource 2121 is used to specially provide memory storage space for a front-end node 24, and the global resource 2122 may be jointly used by the front-end node 24 and a front-end node 25 as memory storage space.

For related descriptions of dividing the memory 212 and the memory 222 into the local resources and the global resources, refer to the foregoing descriptions of corresponding components and component functions of the service nodes in FIG. 3A. Details are not described herein again.

The following mainly uses the system architecture shown in FIG. 3A to describe a specific implementation process of technical solutions provided in embodiments. Specifically, the following describes the specific implementation process of the technical solutions provided in embodiments from two aspects.

In a first aspect, for how to allocate shares of a local resource and a global resource in memory resources of a service node, an embodiment provides a memory resource allocation method. In the memory resource allocation method, shares of a local resource and a global resource in memory resources are dynamically adjusted, so that more memory resources are allocated to the local resource when a requirement for the local resource is large, and more memory resources are allocated to the global resource when a requirement for the global resource is large. In this way, memory resources are allocated more properly and system performance is improved.

In a second aspect, in a process of loading data to memory resources of a service node, for use of a specific memory resource (a local resource or a global resource) to load the data, an embodiment provides a data processing method. In the data processing method, when memory resources of a service node are divided into a local resource and a global resource, a proper memory resource can be determined to load data.

The following describes a specific implementation process of a memory resource allocation method in a scenario in which memory resources of a service node are divided into a local resource and a global resource (that is, the memory resource allocation method provided in the first aspect).

Figure 5:
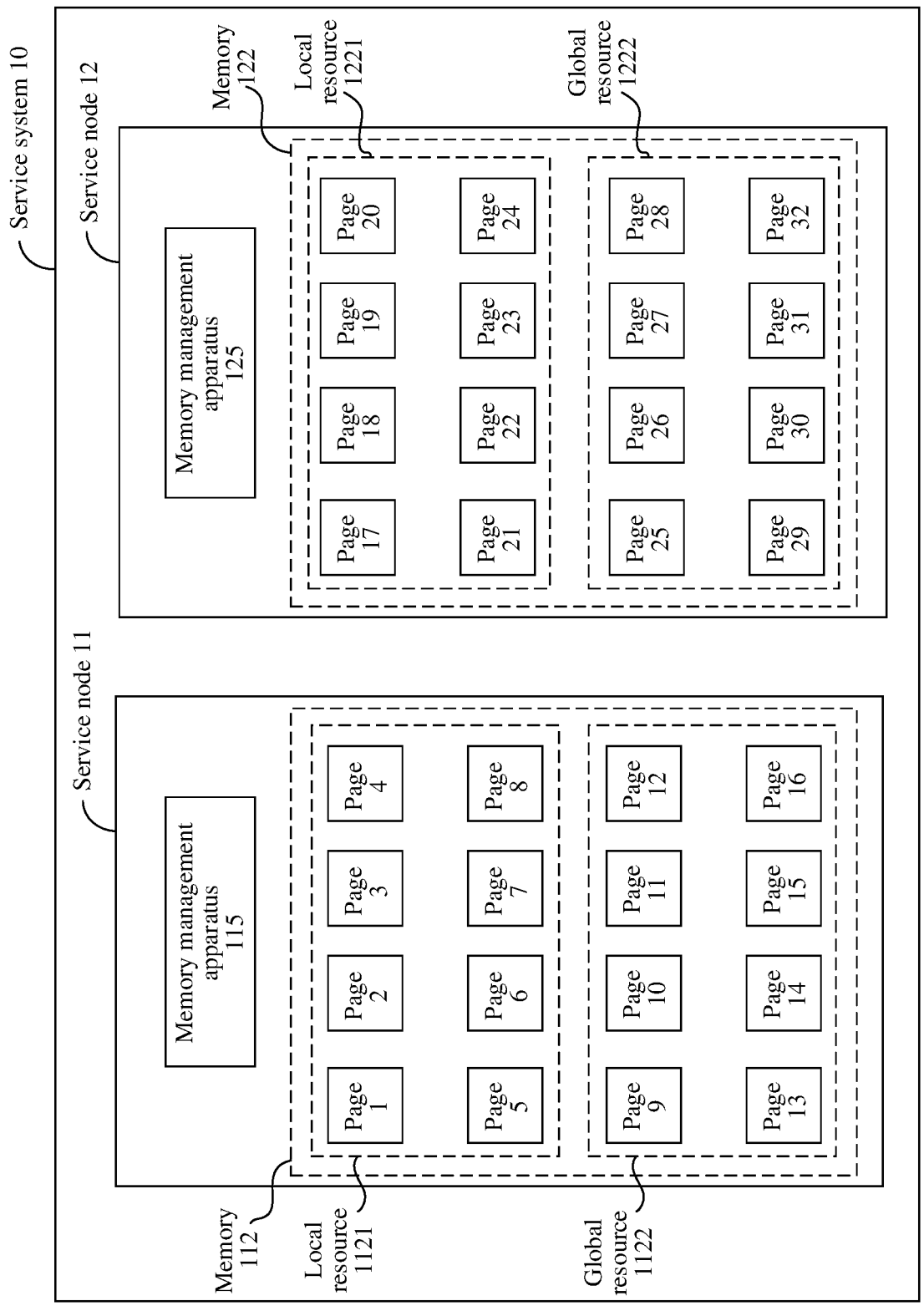
FIG. 5 is a schematic diagram 6 of a structure of a service system according to this application.

In an implementation, as shown in FIG. 5, service nodes (two service nodes: a service node 11 and a service node 12 shown in the figure) in a service system 10 include memory management apparatuses (that is, a memory management apparatus 115 and a memory management apparatus 125 in the figure) capable of managing memory resources of the service nodes. The memory management apparatus 115 is used as an example. The memory management apparatus 115 can implement, according to the methods provided in embodiments, functions such as dividing a memory 112 into a local resource 1121 and a global resource 1122, adjusting shares occupied by the local resource 1121 and the global resource 1122 in the memory 112, and loading data to the memory 112.

In an actual application process, functions of the memory management apparatus included in each service node may be implemented by using hardware, or may be implemented by using a software program.

Specifically, the service node 11 is used as an example. The memory management apparatus stores program code in the memory 112, and a processor 111 runs the program code to divide the memory 112 into the local resource 1121 and the global resource 1122 and adjust the shares of the local resource 1121 and the global resource 1122.

Alternatively, the memory management apparatus may be a hardware accelerator card, for example, a neural network processing unit (NPU), a tensor processing unit (TPU), a field programmable gate array (FPGA), or an application-specific integrated circuit (ASIC). In this case, the memory management apparatus is located inside the service node 11, and may access the memory 112 through a bus. A structure of the hardware accelerator card is not shown in FIG. 1, and is described in a subsequent implementation.

In addition, the service system 10 further includes a management node (not shown in the figure) that may communicate with the service nodes, and the management node can manage the service nodes. For example, the service nodes report information such as capacities and addresses of global resources to the management node, and the management node performs unified addressing on the reported global resources and then notifies the service nodes. The management node may be any service node in the service system 10, or may be a server independent of a plurality of service nodes.

It can be understood that in the service system 10 shown in this embodiment, hardware or software apparatuses (such as the memory management apparatus and the management node in the foregoing example) that can implement, according to the methods provided in embodiments, the functions such as dividing the memory 112 into the local resource 1121 and the global resource 1122, adjusting the shares occupied by the local resource 1121 and the global resource 1122 in the memory 112, and the loading data to the memory 112 are needed. Locations at which the hardware or the software apparatuses are deployed in the service system 10 may not be limited in this embodiment.

Figure 6:
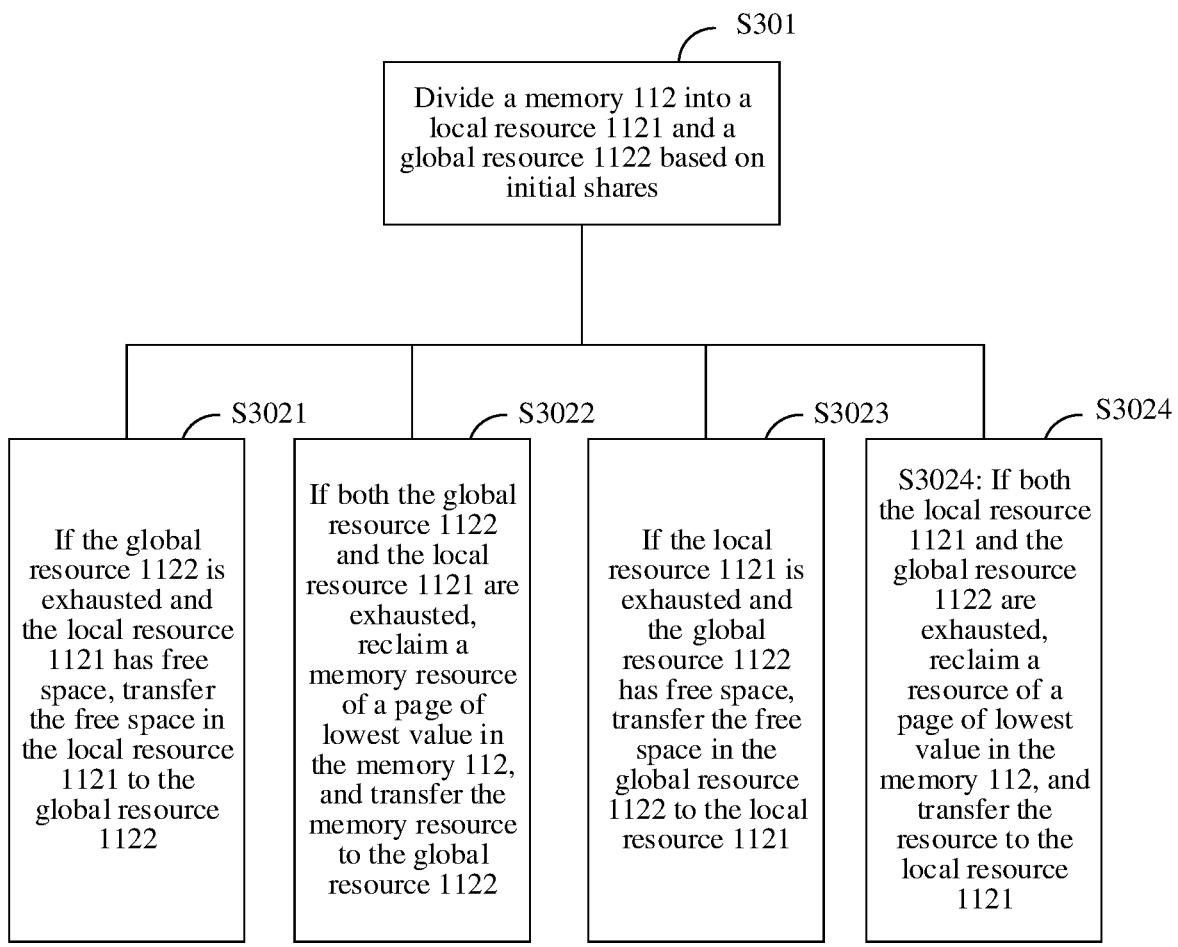
FIG. 6 is a schematic flowchart of a memory resource allocation method according to this application.

The following uses the service node 11 as an example to describe the memory resource allocation method provided in embodiments. As shown in FIG. 6, the method may include the following steps.

S301: The memory management apparatus 115 divides the memory 112 into the local resource 1121 and the global resource 1122 based on initial shares.

For example, in the service node 11, initial shares may be preset (for example, the initial shares of both the local resource 1121 and the global resource 1122 occupy 50%), and the initial shares are recorded in configuration information of the service node 11. When the service node 11 runs online, the memory management apparatus 115 loads the configuration information, uses 50% memory resources in the memory 112 as the global resource, and performs unified addressing on the global resource and global resources of other service nodes, to establish a global memory resource pool 14. The other 50% memory resources do not undergo unified addressing, but serve as the local resource 1121 that are used only by the local service node.

For example, as shown in FIG. 5, the memory 112 of the service node 11 has a total of 16 pages (namely, a page 1 to a page 16). Based on the initial shares, the memory management apparatus 115 uses the page 1 to the page 8 as the local resource 1121 and uses the page 9 to the page 16 as the global resource 1122.

It can be understood that in an actual application process, in an example, the initial shares may be fixed values preset by a person skilled in the art. In another example, the initial shares may be values determined based on a current running environment of the service node 11 (for example, a type or an attribute of an application that is run on the service node 11, and information about a hardware type of the service node 11). A manner of determining the initial shares may not be limited in this embodiment.

Alternatively, in some scenarios, initial shares may be set. For example, when the service node 11 runs online, all memory resources in the memory 112 may be used as the local resource 1121, all memory resources in the memory 112 may be used as the global resource 1122, or the local resource 1121 and the global resource 1122 are obtained through random division based on specific shares. Then, in the running process of the service node 11, the shares of the local resource 1121 and the global resource 1122 in the memory resources are dynamically adjusted (that is, S302), to achieve a more proper memory resource share proportion. It can be understood that in this scenario, content of S301 may not be performed.

S302: In the running process of the service node 11, the memory management apparatus 115 adjusts the shares of the local resource 1121 and the global resource 1122 in the memory resources based on demanded amounts of the local resource 1121 and the global resource 1122.

Specifically, in an implementation, in a scenario in which a data page needs to be loaded to the global resource 1122, S302 may specifically include the following step.

S3021: If the global resource 1122 is exhausted and the local resource 1121 has free space, the memory management apparatus 115 transfers the free space in the local resource 1121 to the global resource 1122.

Specifically, the free space in the local resource 1121 is transferred to the global resource 1122, to expand space of the global resource 1122, and load the data page to the global resource 1122.

Figure 7:
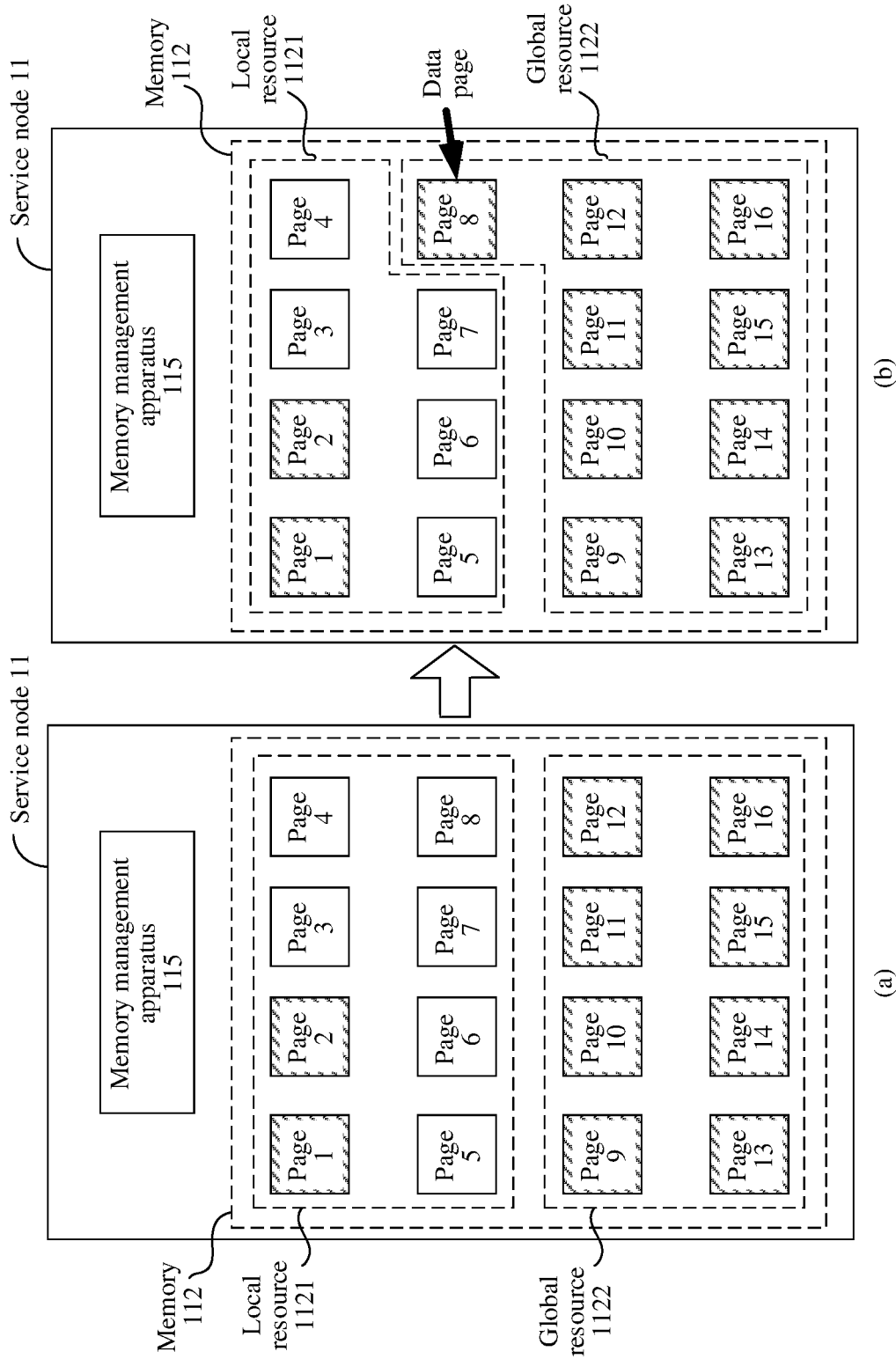
FIG. 7 is a schematic diagram 1 of memory resource allocation according to this application.

For example, as shown in (a) in FIG. 7, in the memory 112 of the service node 11, the local resource 1121 includes a page 1 to a page 8, and the global resource 1122 includes a page 9 to a page 16. The page 3 to the page 8 in the local resource 1121 are free space, and the global resource 1122 is exhausted, that is, the page 9 to the page 16 are all occupied. In this case, if a data page is to be loaded to the global resource 1122, as shown in (b) in FIG. 7, the free space page 8 in the local resource 1121 is transferred to the global resource 1122, and the to-be-loaded data page is loaded to the page 8.

In this embodiment, transferring storage space in a local resource of a service node to a global resource may be specifically represented as changing an access manner of the storage space, so that the storage space is accessed based on an access manner of the global resource, and is no longer accessed based on an access manner of the local resource.

For example, for a service node, addresses are allocated to a local resource and a global resource in different addressing manners. A local address is allocated to the local resource, so that the local service node accesses the local resource based on the local address. A unique address (also referred to as a global address) in the global memory resource pool is allocated to the global resource, and is used by each service node to access the global resource based on the global address. In this case, transferring storage space in the local resource of the service node to the global resource may be specifically implemented by allocating the unique address (namely, the global address) in the global memory resource pool to the storage space, and deleting or invalidating the local address of the storage space.

(a) in FIG. 7 is used as an example. The free space page 8 in the local resource 1121 may be transferred to the global resource 1122 by allocating a global address in a global memory resource pool to the page 8. Then, each service node may access the page 8 based on the global address by using RDMA or another technology.

In addition, it should be noted that, that a resource is exhausted (for example, the global resource 1122 in S3021 is exhausted) in this embodiment may mean that the resource has no free space, or a free space in the resource is less than a space size threshold. Similar content in the following can be understood similarly, and is not described again.

In another implementation, in a scenario in which a data page needs to be loaded to the global resource 1122, S302 may alternatively include the following step.

S3022: If both the global resource 1122 and the local resource 1121 are exhausted, the memory management apparatus 115 reclaims a memory resource of a page of lowest value in the memory 112 (that is, the local resource 1121 and the global resource 1122), and transfers the memory resource to the global resource 1122.

If the reclaimed memory resource originally belongs to the global resource 1122, the memory resource may not be transferred to the global resource 1122.

In the foregoing implementation, the memory resource of the page of the lowest value in the memory 112 is reclaimed, and the reclaimed memory resource is transferred to the global resource 1122, to expand free space in the global resource 1122, and load the data page to the global resource 1122.

Figure 8:
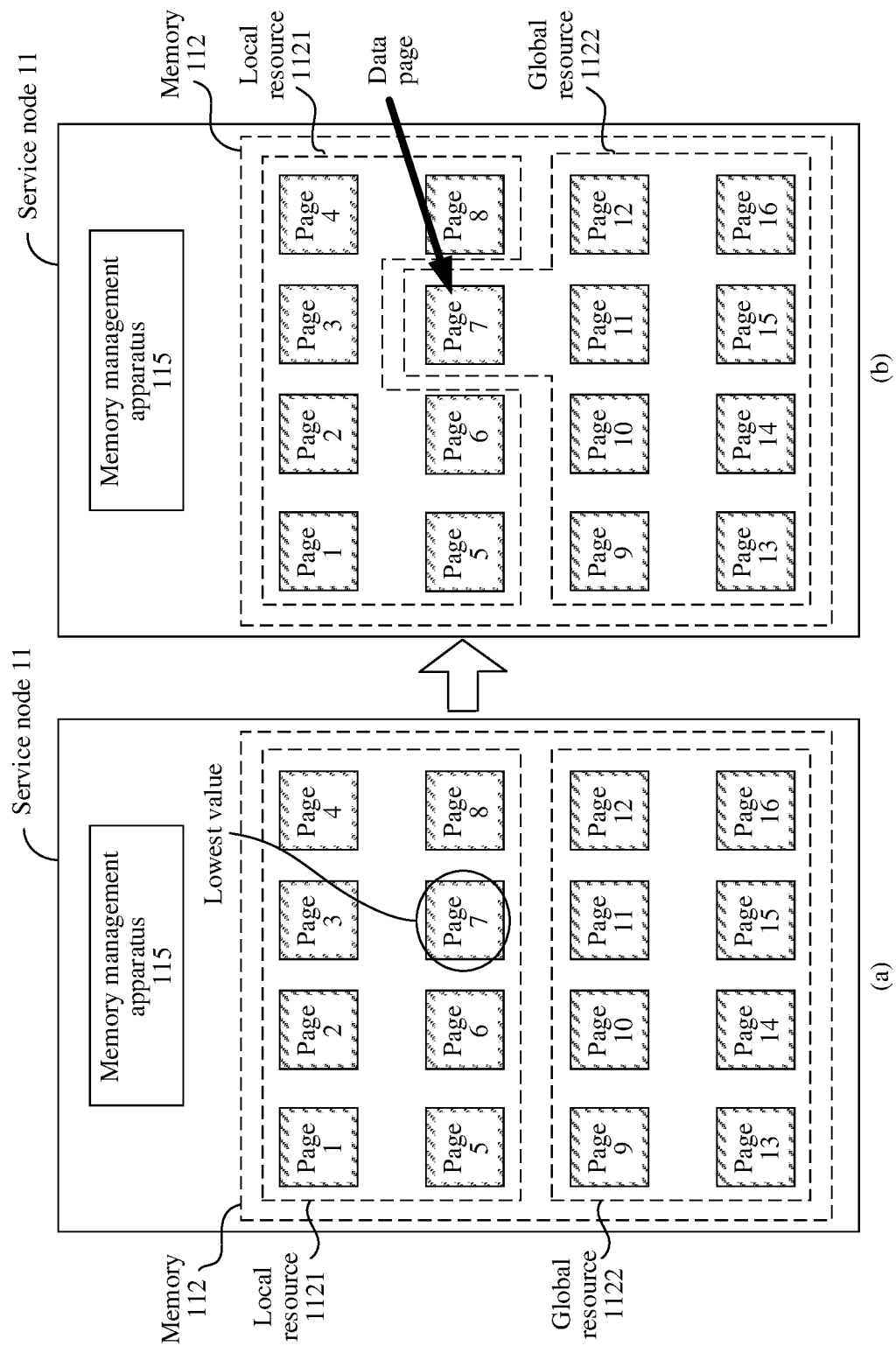
FIG. 8 is a schematic diagram 2 of memory resource allocation according to this application.

For example, as shown in (a) in FIG. 8, both the local resource 1121 and the global resource 1122 are occupied, and data loaded to a page 7 is a page of lowest value in the memory 112. In this case, if a data page is to be loaded to the global resource 1122, as shown in (b) in FIG. 8, the service node 11 reclaims a memory resource of the page 7, transfers the page 7 to the global resource 1122, and loads the to-be-loaded data page to the page 7.

It should be noted that in this embodiment, the page of the lowest value may be specifically a page that is in the memory 112 and that is accessed for a minimum quantity of times, a page that is accessed at a longest time interval from a previous time, or the like. A standard for evaluating value of a page may not be limited in this embodiment.

Figure 9:
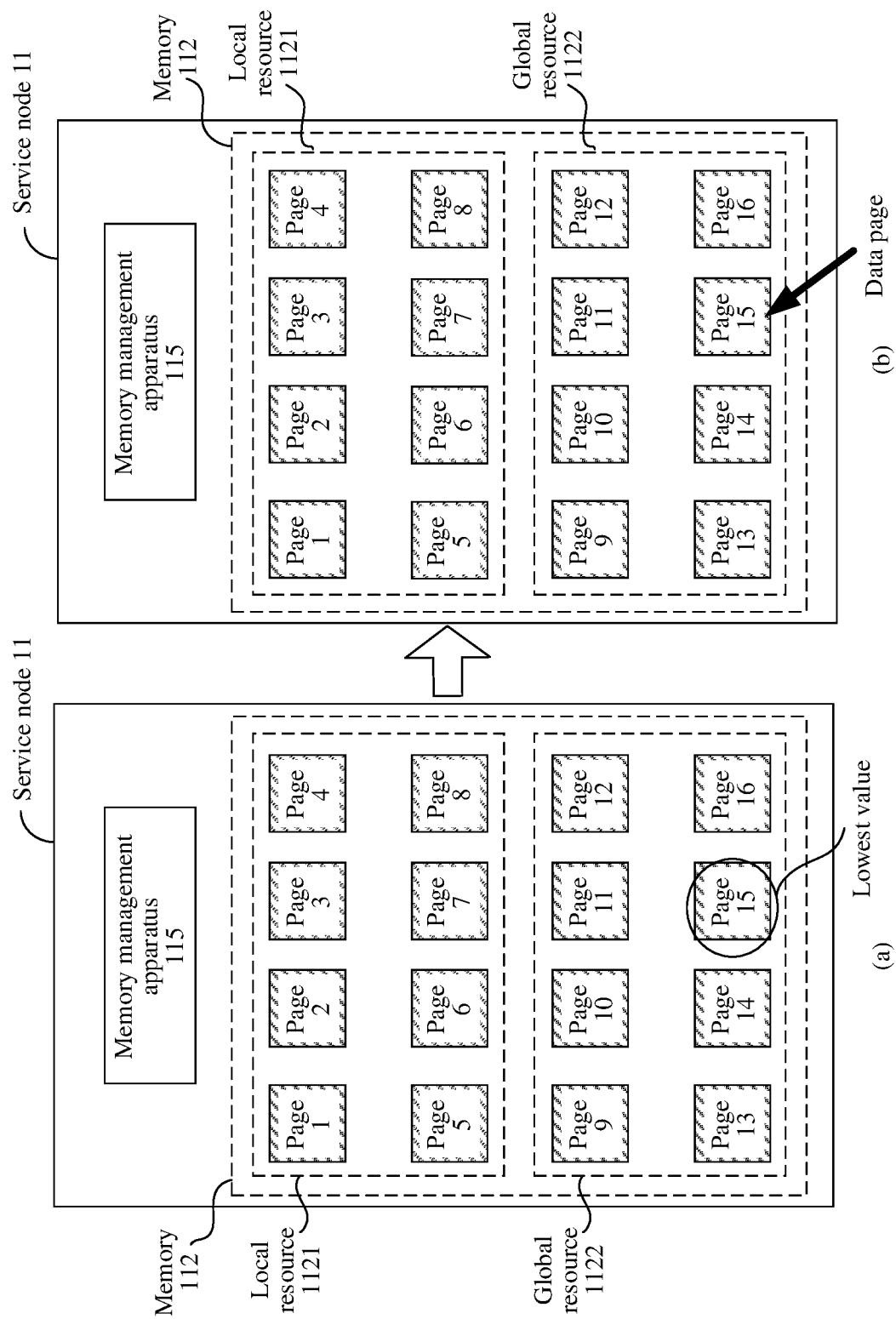
FIG. 9 is a schematic diagram 3 of memory resource allocation according to this application.

For another example, as shown in (a) in FIG. 9, both the local resource 1121 and the global resource 1122 are occupied, and data loaded to a page 15 is a page of lowest value in the memory 112. In this case, if a data page is to be loaded to the global resource 1122, as shown in (b) in FIG. 9, the service node 11 reclaims a memory resource of the page 15 (because the page 15 is originally a resource in the global resource 1122, the page 15 does not need to be transferred to the global resource in this case), and loads the to-be-loaded data page to the page 15.

In the implementations of S3021 and S3022, in a possible design, when data is continuously loaded to the global resource 1122, if no data is loaded to the local resource 1121, all memory resources of the local resource 1121 may be transferred to the global resource 1122, to fully use the memory resources. In another design, a minimum resource threshold may be set for the local resource 1121, so that at least a part of memory resources (that is, a memory resource size indicated by the minimum resource threshold) are retained for the local resource 1121. A specific value of the minimum resource threshold may be set depending on an actual requirement. This may not be limited in this embodiment.

In still another implementation, in a scenario in which a data page needs to be loaded to the local resource 1121, S302 may specifically include the following step.

S3023: If the local resource 1121 is exhausted and the global resource 1122 has free space, the memory management apparatus 115 may transfer the free space in the global resource 1122 to the local resource 1121.

In this embodiment, transferring storage space in a global resource of a service node to a local resource may be specifically represented as changing an access manner of the storage space, so that the storage space is accessed based on an access manner of the local resource, and is no longer accessed based on an access manner of the global resource.

For example, transferring storage space in the global resource of the service node to the local resource may be specifically implemented by allocating a local address to the storage space, and deleting or invalidating a global address of the storage space. After the local address is allocated to the storage space and the global address of the storage space is deleted or invalidated, each service node cannot access the storage space by using the global address, so that the storage space is specially used to provide memory storage space for the local service node. Similar content in the following can be understood similarly, and is not described below again.

For a specific implementation process of S3023, refer to S3021. Details are not described herein again.

Alternatively, S302 may further include the following step.

S3024: If both the local resource 1121 and the global resource 1122 are exhausted, the memory management apparatus 115 may reclaim a resource of a page of lowest value in the memory 112 (that is, the local resource 1121 and the global resource 1122), and transfers the resource to the local resource 1121.

For a specific implementation process of S3024, refer to S3022. Details are not described herein again.

It can be understood that, similar to S3023 and S3024, in a possible design, when data is continuously loaded to the local resource 1121, all memory resources of the global resource 1122 may be transferred to the local resource 1121. In another possible design, a minimum resource threshold may be set for the global resource 1122, so that at least a part of memory resources are retained for the global resource 1122.

In this embodiment, in the memory resource allocation method, the shares of the local resource and the global resource in memory resources are dynamically adjusted, so that more memory resources are allocated to the local resource when a requirement for the local resource is large, and more memory resources are allocated to the global resource when a requirement for the global resource is large. In this way, memory resources are allocated more properly and system performance is improved.

Figure 10:
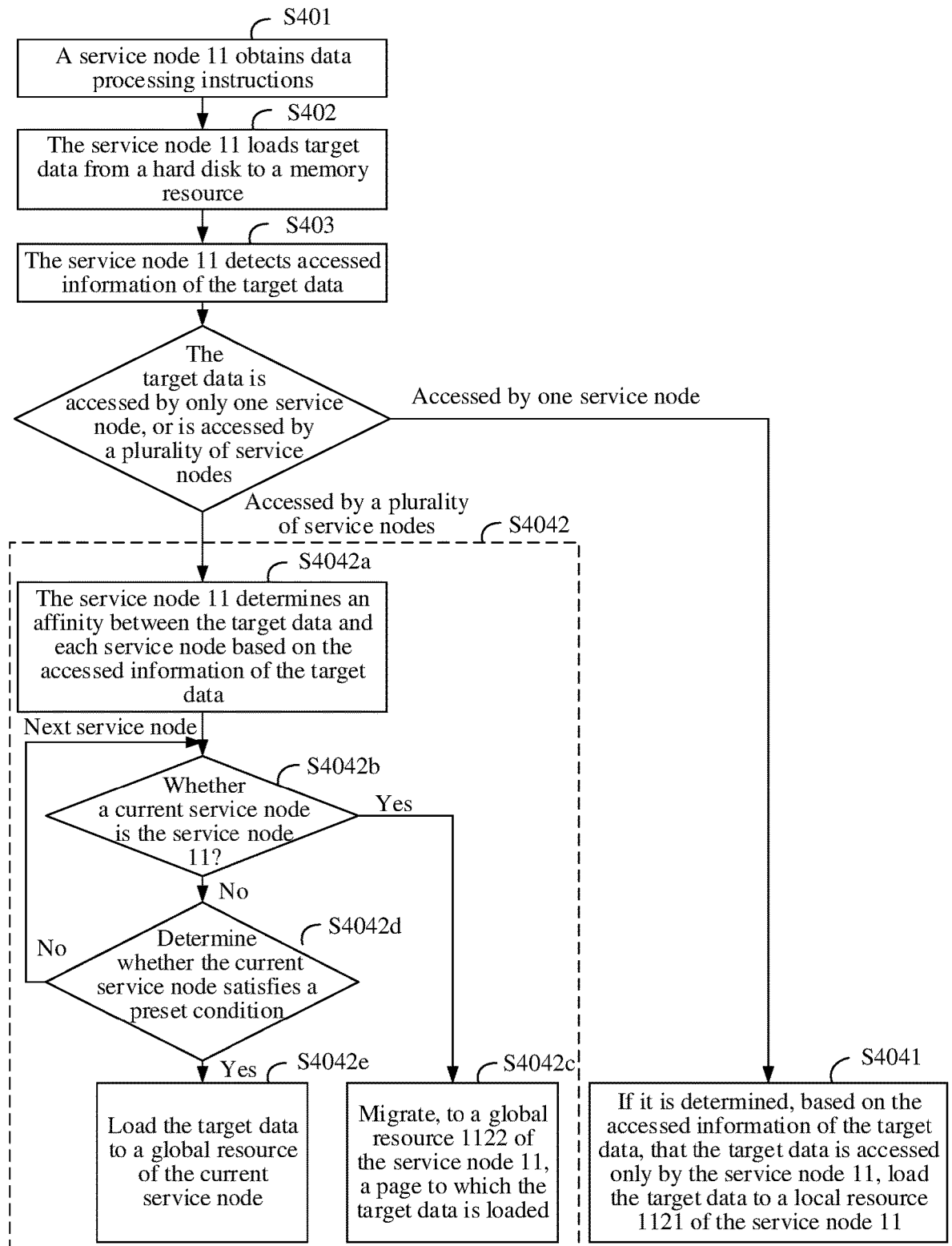
FIG. 10 is a schematic flowchart 1 of a data processing method according to this application.

The following uses the service system 10 as an example to describe the process of loading data to a memory of a service node (that is, the data processing method provided in the second aspect) in a scenario in which memory resources of the service node are divided into a local resource and a global resource. Specifically, as shown in FIG. 10, the method includes the following steps.

S401: The service node 11 obtains data processing instructions.

The data processing instructions may be instructions that instruct the service node 11 to process target data in a hard disk (which may be the hard disk 113, the hard disk 123, or the hard disk 133 in the service system 10).

For example, the data processing instructions may be instructions that instruct the processor 111 to run program code stored in the hard disk, and the program code is the foregoing target data. For another example, the data processing instructions may be instructions that instruct the processor 111 to process data such as an image and a text stored in the hard disk, and the image and the text are the foregoing target data.

S402: The service node 11 loads the target data from the hard disk to a memory resource.

Specifically, when the service node 11 loads the target data to the memory resource for the first time, the memory management apparatus 115 may first temporarily load the target data to the local resource 1121 or the global memory resource pool 14, so that the processor 111 processes the target data. Then, according to the following step S404, the target data is migrated to a proper memory resource based on accessed information of the target data (including information such as which nodes access the target data and frequency of accessing the target data by each node).

In an implementation, the following content is considered in this embodiment: The data loaded by the service node 11 to the memory resources is accessed by at least the service node 11. In addition, after the data is loaded to the memory resources, other service nodes may or may not access the data. Therefore, when the data is loaded to the memory resources for the first time, the data may be first loaded to the local resource, so that a local service node (namely, the service node 11) quickly accesses the target data. In this case, S402 may specifically include the following step.

S4021: The service node 11 loads the target data from the hard disk to the local resource 1121.

It should be noted that in an actual application process, the service node 11 may alternatively load the target data to the global memory resource pool 14. For example, the service node 11 may load the target data to the global resource 1122, or the service node 11 may load the target data to a global resource (for example, the global resource 1222) of another service node. When the service node 11 loads the target data to the global memory resource pool 14, the foregoing step S4021 may not be performed. This may not be limited in this embodiment.

In a possible design, in a process of loading the target data to the local resource 1121, if the local resource 1121 is exhausted, but the global resource 1122 has free space, the free space in the global resource 1122 may be transferred to the local resource 1121 by using the foregoing step S3023, to load the target data to the local resource 1121.

In another possible design, in a process of loading the target data to the local resource 1121, if both the local resource 1121 and the global resource 1122 are exhausted, the resource of the page of the lowest value in the memory 112 (that is, the local resource 1121 and the global resource 1122) may be reclaimed by using the foregoing step S3024, to load the target data to the reclaimed memory resource.

For specific implementation processes of the foregoing two designs, refer to related descriptions of S3023 and S3024. Details are not described herein again.

S403: The service node 11 detects the accessed information of the target data.

The accessed information of the target data may include various types of information used to reflect a quantity of times or frequency of accessing the target data by each service node. For example, the accessed information of the target data may specifically include information such as a quantity of times that the target data is accessed by each service node in a period of time, and interval duration between two adjacent times for accessing the target data.

Specifically, after the target data is loaded to the local resource 1121 by using S4021, each service node in the service system 10 may access the target data by accessing the local resource 1121. For example, the processor 111 of the service node 11 may access the target data in the local resource 1121 in a conventional access manner. Remote service nodes (namely, the service node 12, the service node 13, and the like) may access the target data by accessing the local resource 1121 in an RPC manner. Then, the service node 11 may detect the accessed information of the target data by recording a status of accessing the target data by each service node in a period of time.

S404: The service node 11 reallocates a memory resource to the target data based on the accessed information of the target data.

Specifically, S404 may include the following S4041 and S4042:

S4041: If it is determined, based on the accessed information of the target data, that the target data is accessed only by the service node 11, load the target data to the local resource 1121 of the service node 11.

If the target data has been loaded to the local resource 1121 when the target data is loaded for the first time (that is, S4021), the target data may not be loaded again, that is, the step of loading the target data to the local resource 1121 of the service node 11 in S4041 is not performed.

S4042: If it is determined, based on the accessed information of the target data, that the target data is accessed by a plurality of service nodes, load the target data to the global memory resource pool 14.

In a possible design, in this embodiment, the target data may be loaded to a memory resource in the global memory resource pool 14 based on an affinity between the target data and each service node. For example, the target data may be preferentially loaded to a global resource of a service node having a closest affinity with the target data, so that access efficiency of the target data can be improved.

In this embodiment, an affinity between data and a service node can also be understood as value of the data for the service node. Larger value of the data for the service node indicates a higher affinity, and smaller value indicates a lower affinity. For example, the affinity between data and a service node may be reflected as information such as a quantity of times and frequency of accessing the data by the service node. A larger quantity of times and higher frequency of accessing the data by the service node indicate a higher affinity, and a smaller quantity of times and lower frequency indicate a lower affinity.

Specifically, in a process of allocating the memory resources to the target data based on affinities between the target data and the service nodes, first, to improve access efficiency of the target data, the target data may be preferentially loaded to a global resource of a service node with a close affinity in this embodiment. Further, when memory resources of the service node with a close affinity are exhausted, a memory resource of low value in the memory resources of the service node with a close affinity may be reclaimed, and then the target data may be loaded by using the reclaimed memory resource. Alternatively, the target data may be loaded to a global resource of a service node with a lower affinity. The following details a specific implementation process of allocating the memory resources to the target data. The implementation process may specifically include the following steps.

S4042a: Determine the affinity between the target data and each service node based on the accessed information of the target data.

After the affinity between the target data and each service node is determined, some or all of the following steps S4042b to S4042e may be separately performed on the service nodes in descending order of the affinities, until the target data is loaded to the global memory resource pool 14.

S4042b: Determine whether a current service node is the service node 11 (that is, a service node that loads the target data for the first time).

If the current service node is the service node 11 (that is, the service node that loads the target data for the first time), S4042c is performed. In contrast, if the current service node is not the service node 11, S4042d is performed.

S4042c: Migrate, to the global resource 1122 of the service node 11, a page that is in the service node 11 and to which the target data is loaded.

For example, an address of the page to which the target data is loaded may be modified, to modify the address of the page from an address in the local resource 1121 to an address in the global memory resource pool 14, to migrate the page to the global resource 1122. In this process, the target data may be loaded to the global resource 1122 of the service node 11 without a need to perform resource reclamation on the page to which the target data is loaded or copy the target data.

S4042d: Determine whether the current service node satisfies a preset condition.

If it is determined that the current service node satisfies the preset condition, the target data is loaded to a global resource of the current service node (that is, S4042e in the figure). If the current service node does not satisfy the preset condition, subsequent service nodes are traversed in descending order of the affinities.

The preset condition may specifically include any one of the following:
(1) the global resource of the current service node has free space;
(2) the global resource of the current service node has no free space, but the local resource has free space; and
(3) none of memory resources (that is, the global resource and a local resource) of the current service node has free space, but other data whose value is less than that of the target data has been loaded to the memory resources of the service node.

The following describes specific implementation processes of S4042d and S4042e by using the service node having the closest affinity with the target data as an example.

Figure 11A:
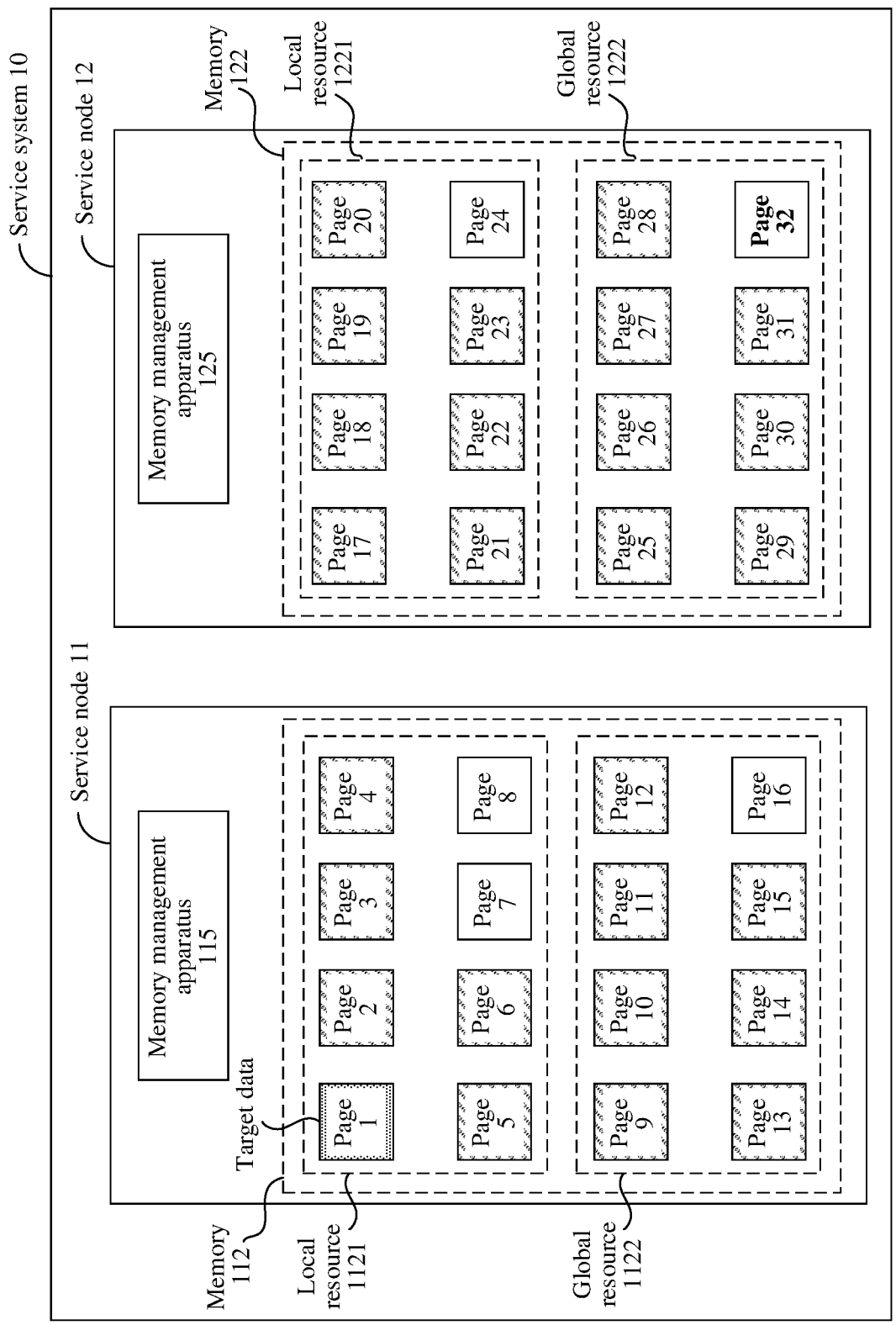
FIG. 11($a$) and FIG. 11($b$) are a schematic diagram 1 of data processing according to this application.
Figure 11B:
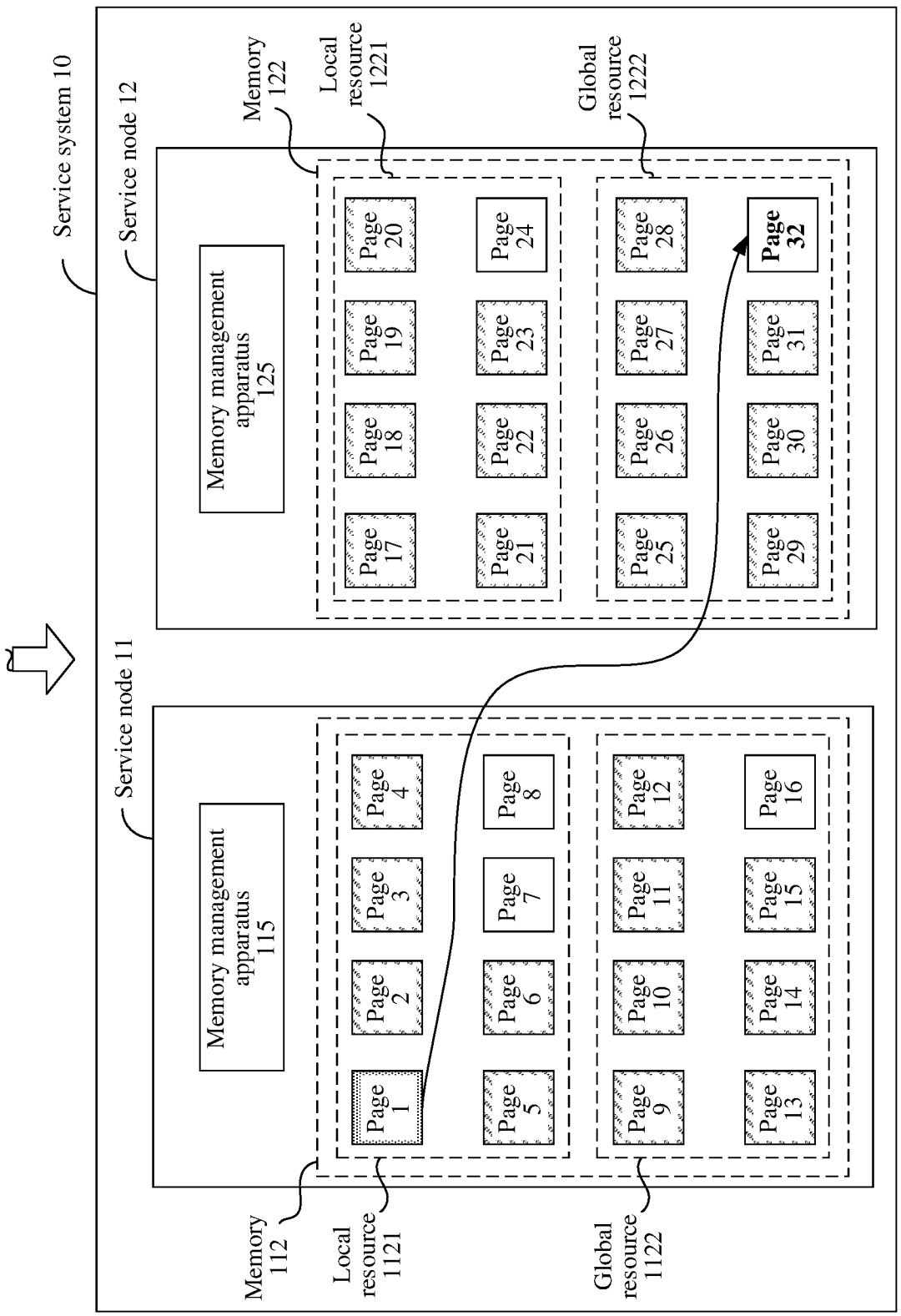

For example, as shown in FIG. 11(a) and FIG. 11(b), in FIG. 11(a), the service node 11 first loads the target data to the page 1 in the local resource 1121 according to S402. If it is determined, based on the accessed information of the target data, that the target data is accessed by a plurality of service nodes, the service node 12 is determined, based on the affinity between the target data and each service node, as the service node having the closest affinity with the target data. In addition, the global resource 1222 of the service node 12 has free space (a page 32 in the figure), that is, the service node 12 satisfies the foregoing (1) and has a capability of loading the target data.

As shown in FIG. 11(b), the target data is loaded to the page 32. For example, the memory management apparatus 125 in the service node 12 loads the target data from the hard disk to the page 32 of the global resource 1222 by performing a data page loading procedure, to load the target data to the page 32. In addition, the memory management apparatus 115 in the service node 11 may reclaim the page 1 by performing a data page eviction procedure.

Figure 12A:
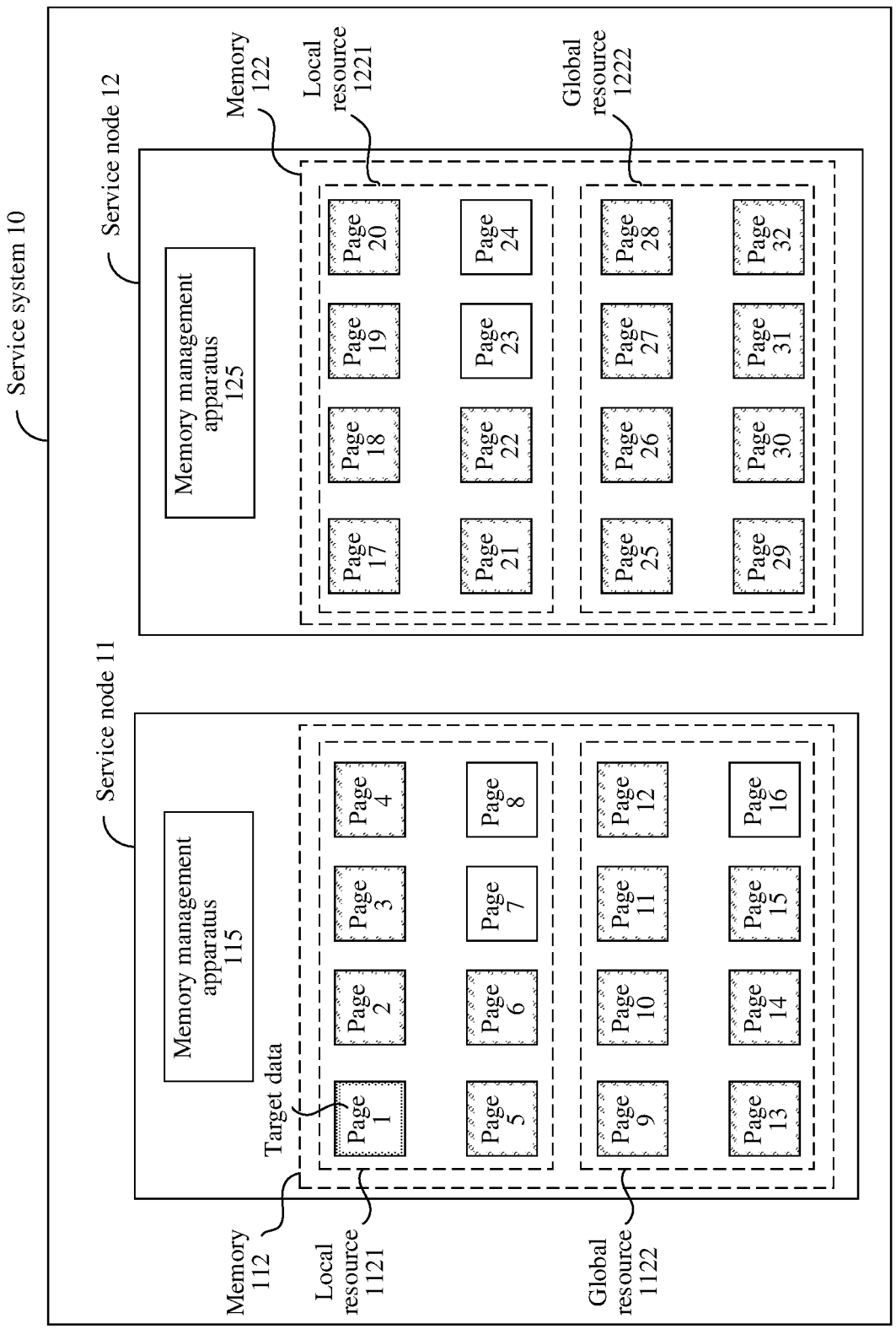
FIG. 12($a$) and FIG. 12($b$) are a schematic diagram 2 of data processing according to this application.
Figure 12B:
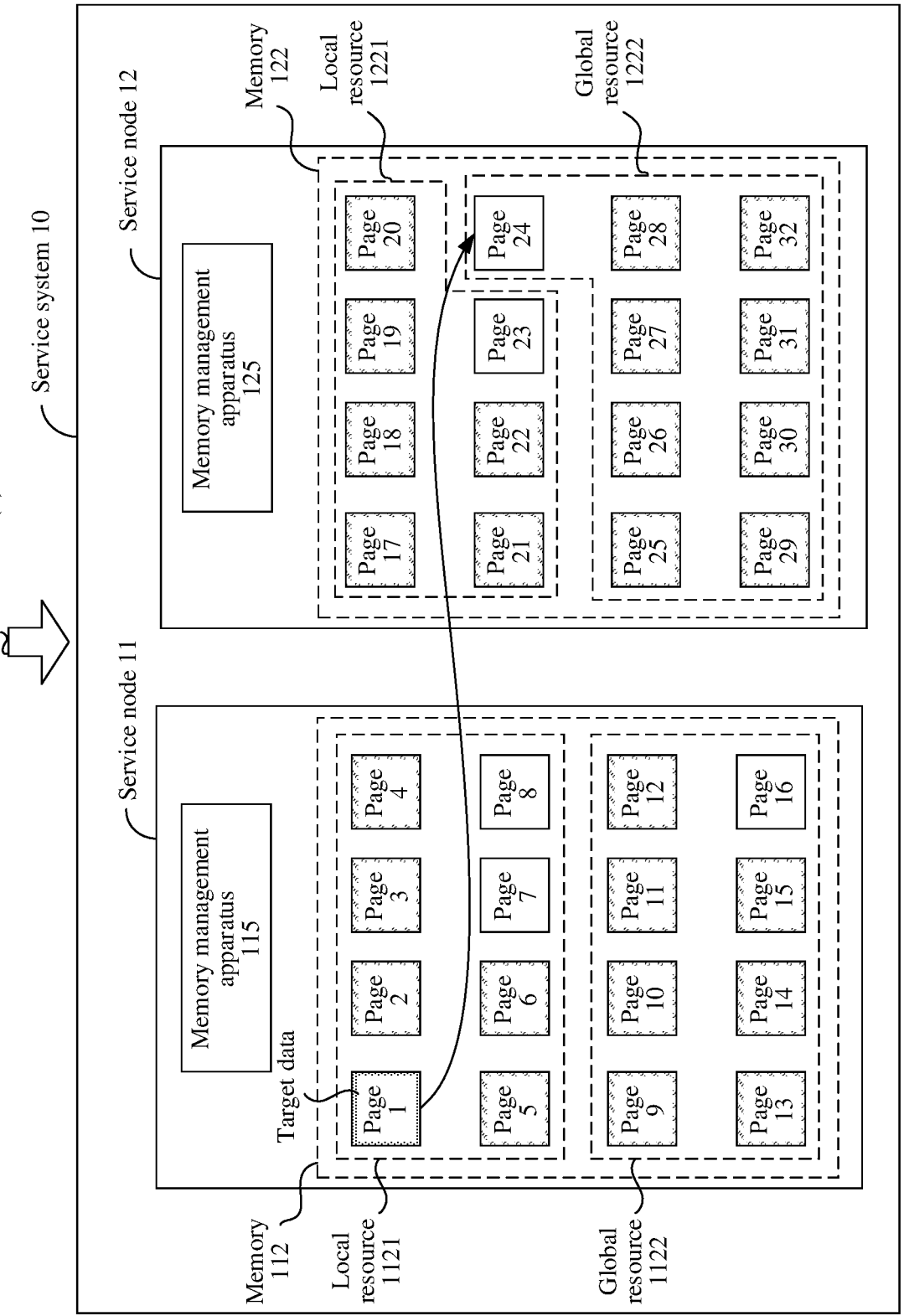

For another example, as shown in FIG. 12(a) and FIG. 12(b), in FIG. 12(a), the service node 11 first loads the target data to the page 1 in the local resource 1121 according to S402. If it is determined, based on the accessed information of the target data, that the target data is accessed by a plurality of service nodes, the service node 12 is determined, based on the affinity between the target data and each service node, as the service node having the closest affinity with the target data. In addition, the global resource 1222 of the service node 12 has no free space, but the local resource 1221 has free space (a page 23 and a page 24 in the figure), that is, the service node 12 satisfies the foregoing (2) and has a capability of loading the target data. As shown in FIG. 12(b), the page 24 may be transferred to the global resource 1222, and the target data is loaded to the page 24.

Figure 13A:
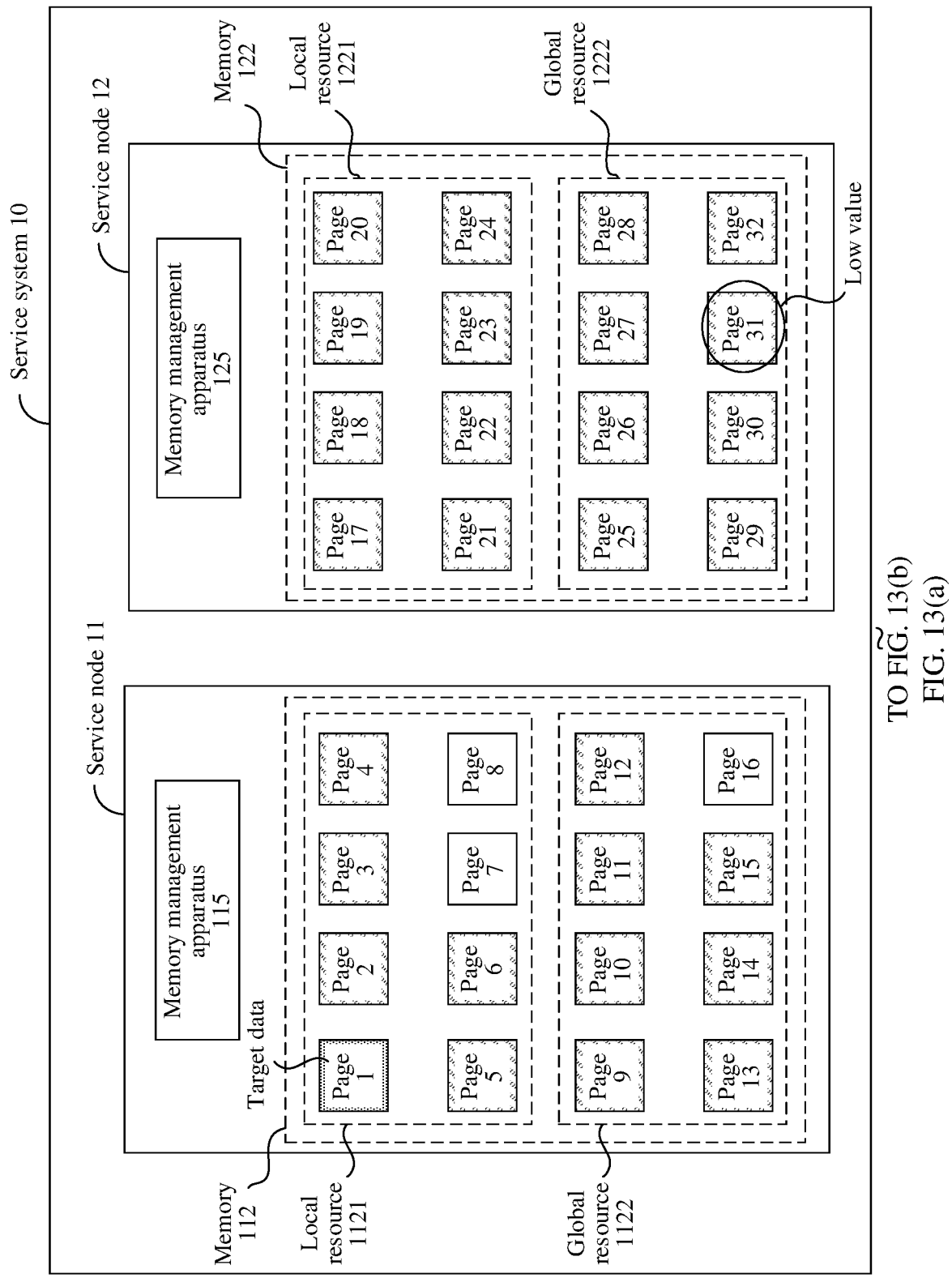
FIG. 13($a$) and FIG. 13($b$) are a schematic diagram 3 of data processing according to this application.
Figure 13B:
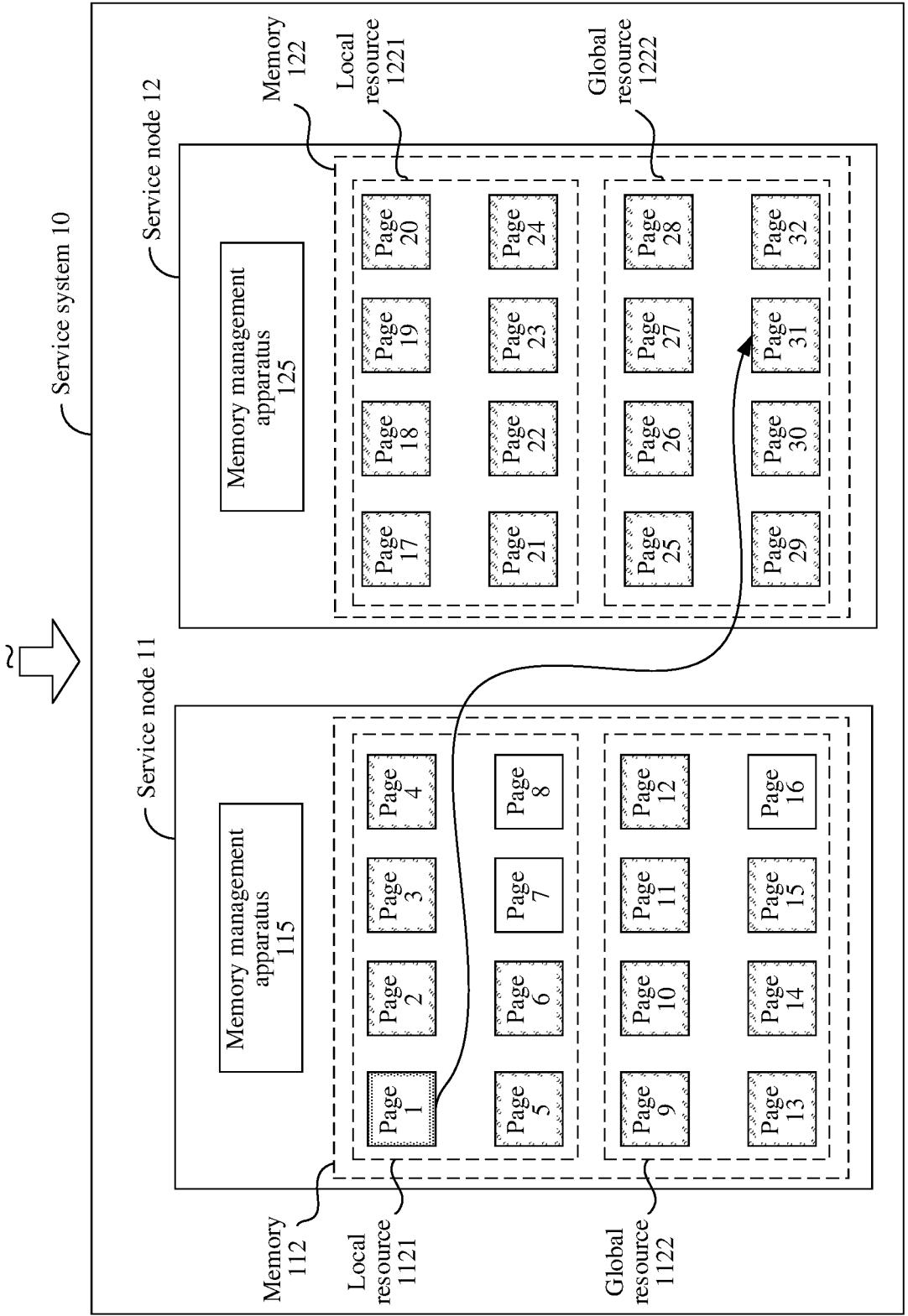

For still another example, as shown in FIG. 13(a) and FIG. 13(b), in FIG. 13(a), the service node 11 first loads the target data to the page 1 in the local resource 1121 according to S402. If it is determined, based on the accessed information of the target data, that the target data is accessed by a plurality of service nodes, the service node 12 is determined, based on the affinity between the target data and each service node, as the service node having the closest affinity with the target data. In addition, neither the local resource 1221 nor the global resource 1222 of the service node 12 has free space, but data whose value is less than that of the target data has been loaded to a page 31 of the global resource 1222. As shown in FIG. 13(b), after a memory resource of the page 31 is reclaimed, the target data may be loaded to the page 31. For a standard for evaluating value of each page, refer to the related descriptions of S3022. Repeated content is not described herein again.

Figure 14A:
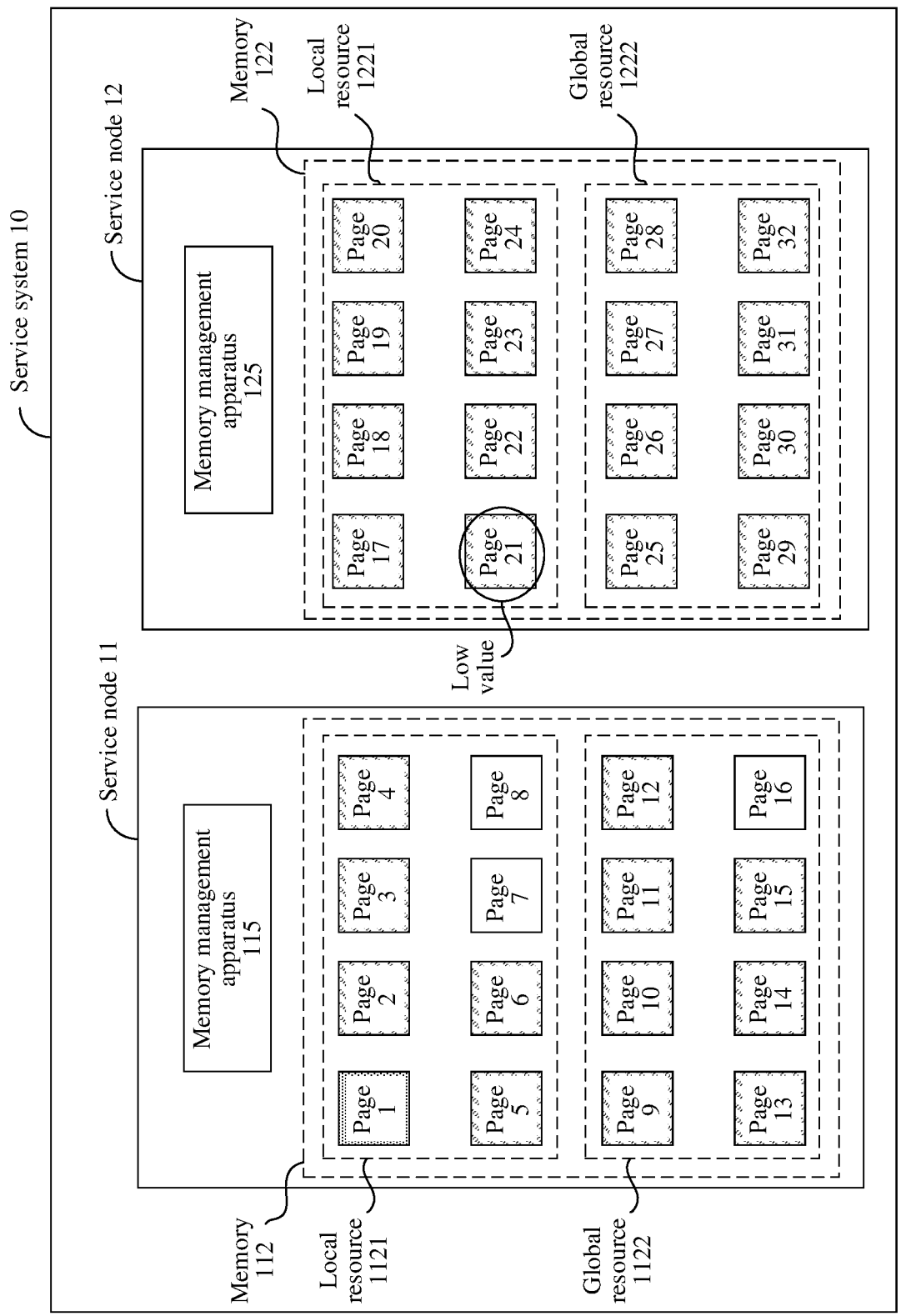
FIG. 14($a$) and FIG. 14($b$) are a schematic diagram 4 of data processing according to this application.
Figure 14B:
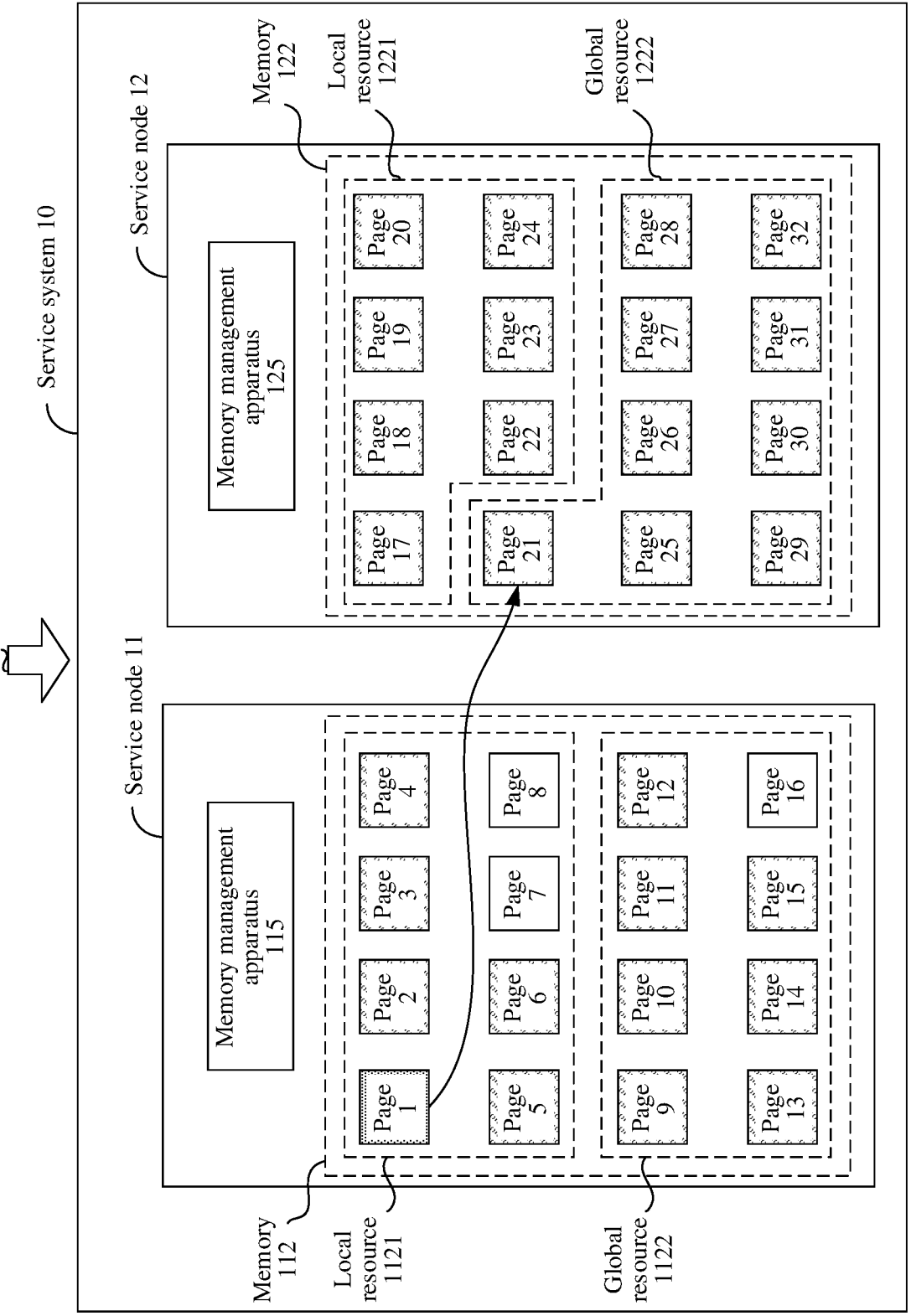

For yet another example, as shown in FIG. 14(a) and FIG. 14(b), in FIG. 14(a), the service node 11 first loads the target data to the page 1 in the local resource 1121 according to S402. If it is determined, based on the accessed information of the target data, that the target data is accessed by a plurality of service nodes, the service node 12 is determined, based on the affinity between the target data and each service node, as the service node having the closest affinity with the target data. In addition, neither the local resource 1221 nor the global resource 1222 of the service node 12 has free space, but data whose value is less than that of the target data has been loaded to a page 21 of the global resource 1221. As shown in FIG. 14(b), after a memory resource of the page 21 is reclaimed and the page 21 is transferred to the global resource 1222, the target data may be loaded to the page 21.

Figure 15:
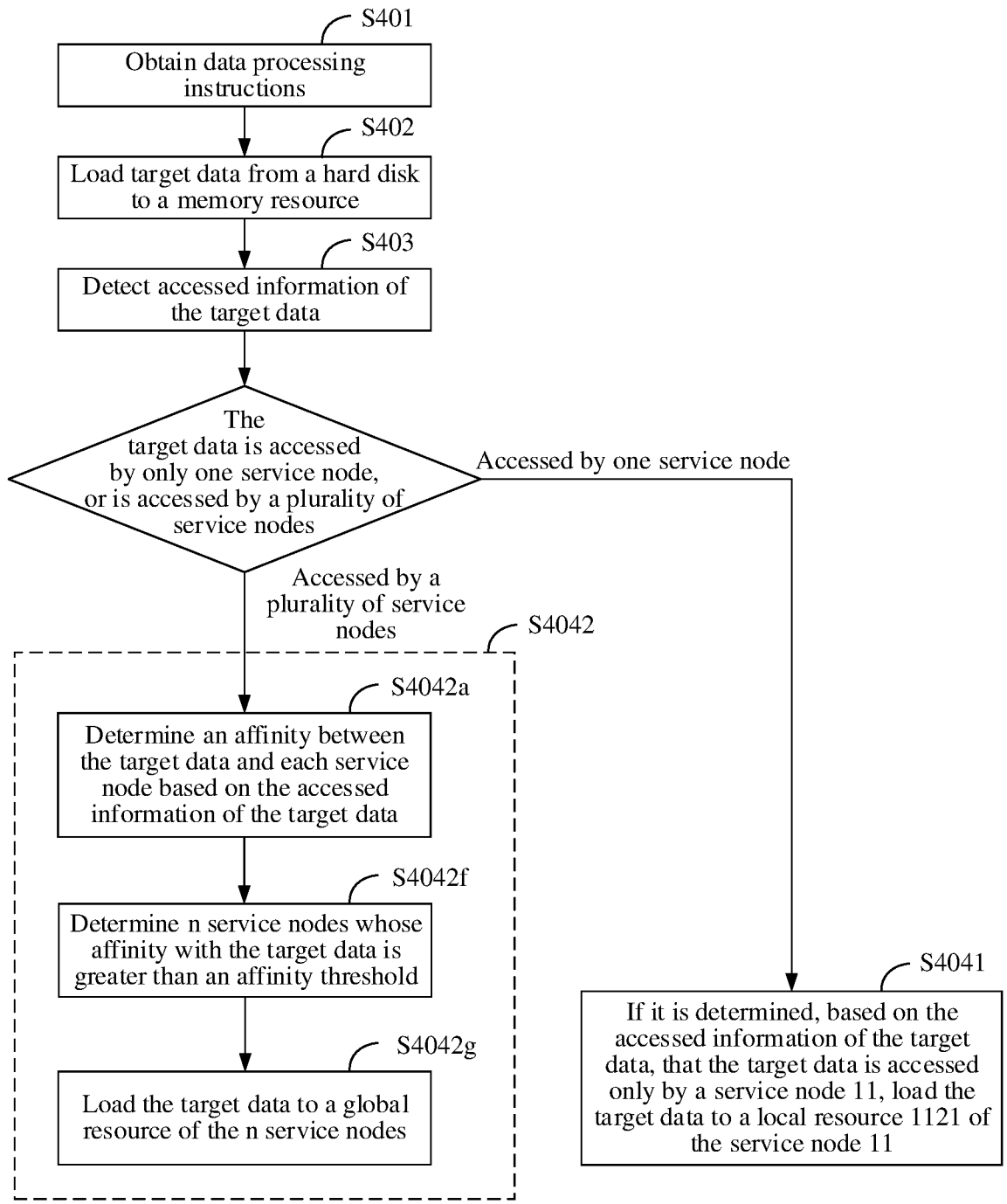
FIG. 15 is a schematic flowchart 2 of a data processing method according to this application.

In a possible design, as shown in FIG. 15, after the affinity between the target data and each service node is determined (that is, S4042a), the method may further include the following steps.

S4042f: Determine n service nodes whose affinity with the target data is greater than an affinity threshold.

S4042g: Load the target data to a local resource of the n service nodes.

The n service nodes are n service nodes whose affinity with the target data is greater than the affinity threshold, and n is a positive integer.

In the foregoing design, when the affinity between the n service nodes and the target data is greater than the affinity threshold, the target data may be loaded to the local resource of the n service nodes, so that the n service nodes access the target data, thereby improving running efficiency of the n service nodes.

It should be noted that, in the flowcharts described in FIG. 11(a) and FIG. 11(b) and FIG. 15, the methods provided in embodiments are mainly described in a scenario in which a memory resource is reallocated to the target data based on the accessed information of the target data after the target data is loaded from a hard disk to a memory resource of a service node for the first time. It can be understood that in actual application, each service node may further periodically detect accessed information of each data page in memory resources of the node, and reallocate a memory resource to each data page based on the accessed information of each data page in the foregoing manner described in S404.

Figure 16:
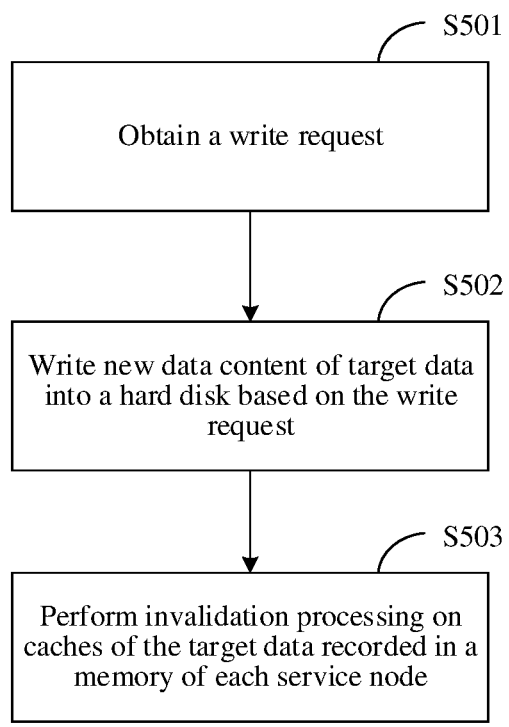
FIG. 16 is a schematic flowchart of a data writing method according to this application.

In addition, in an implementation, it is considered that in the service system 10, each service node can access a memory of the local node or each remote node. Therefore, when a service node updates data by using a write procedure, if no invalidation processing is performed on data copies of the data in a memory, when the local service node or a remote service node accesses the data again, invalid data may be read from the memory. In view of this, to avoid the foregoing case, an embodiment further provides a data writing method. As shown in FIG. 16, the method includes the following steps.

S501: A service node 11 obtains a write request.

The write request is used to update data (referred to as target data below).

Specifically, the write request carries a logical address of the target data and updated data of the target data. The logical address may be an address identifier that is of the target data and that is used by an upper-layer application. For example, the logical address may include a logical unit number (logical unit number, LUN), a logical block address (logical block address, LBA), and a data length that are corresponding to the target data.

S502: The service node 11 writes the updated data into a hard disk (which may be specifically the hard disk 113, the hard disk 123, or the hard disk 133) based on the write request.

S503: The service node 11 performs invalidation processing on data copies of the target data recorded in a memory of each service node.

The invalidation processing may specifically include deleting the data copies in the memory, modifying bitmaps of the data copies in the memory, or the like.

For example, for a data copy of the target data recorded in a memory resource (which may be a local resource or a global resource) of the local service node, the service node 11 may perform invalidation processing or reloading processing in a conventional manner, to release an invalid data copy in the memory. For data copies of the target data recorded in memory resources of a remote service node, the service node 11 may trigger, through one-side access by using RDMA, CXL, or another technology, a network adapter of the remote service node to perform invalidation processing or reloading processing on copy data of the target data recorded in a global resource (for example, the global resource 1222 of the service node 12). In addition, the service node 11 may send a message to the remote service node in an RPC manner or the like, to trigger the remote service node to perform invalidation processing or reloading processing on a data copy of the target data recorded in a local resource (for example, the local resource 1221 of the service node 12).

Figure 17:
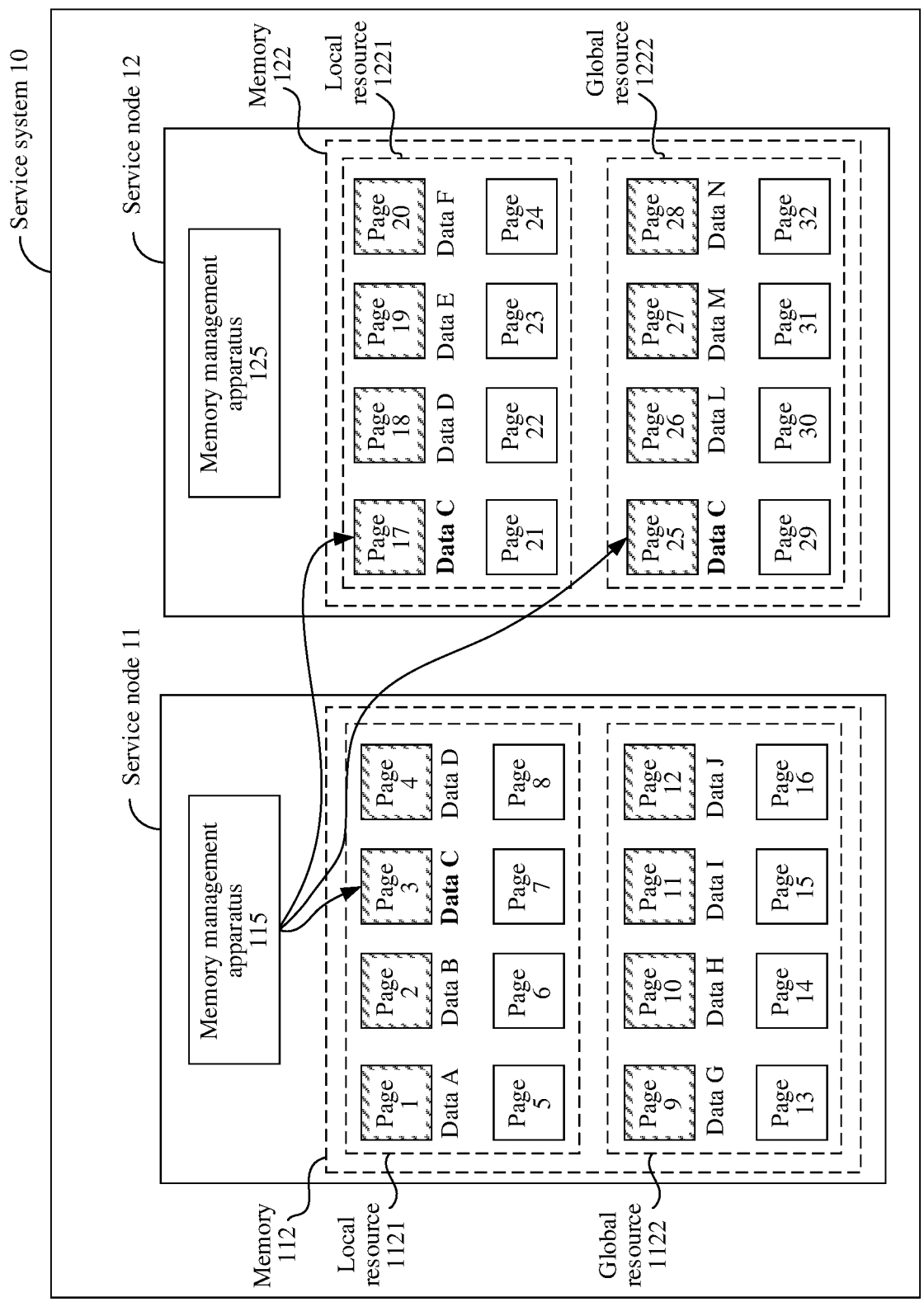
FIG. 17 is a schematic diagram of invalidation processing according to this application.

For example, as shown in FIG. 17, data copies of data C are loaded to a page 3, a page 17, and a page 25. After the data C is updated, the memory management apparatus 115 in the service node 11 may perform invalidation processing on the page 3 in a conventional manner, trigger, through one-side access by using RDMA, CXL, or another technology, a network adapter of the service node 12 to perform cache invalidation on the page 25, and send a message to the service node 12 in an RPC manner, to trigger the service node 12 to perform cache invalidation on the page 17.

In addition, in an implementation, it is considered that in the service system 10, when the target data is updated, invalidation processing needs to be performed on data copies of the data in the memories (which may be specifically data copies loaded to the global memory resource pool 14 in the service system 10, or data copies loaded to the local resources of the service nodes in the service system 10). However, in an actual application process, it takes some time to perform invalidation processing on the data copies in the memories. Therefore, in this embodiment, an access parameter may be set, and the access parameter can indicate whether the data copies of the data in the memories are available. For example, when a service node updates the target data, an access parameter of the target data is set to an "unavailable" state, and the access parameter of the target data is set to an "available" state only after invalidation processing is performed on the data copies of the target data recorded in the memory of each service node.

In this way, when accessing the target data in the memory, the service node may first obtain the access parameter corresponding to the target data, and determine, based on the access parameter, whether the data copies of the target data recorded in the memory are available. If the access parameter indicates an "available" state, the data copies of the target data in the memory are read. If the access parameter indicates an "unavailable" state, the memory may be bypassed, and the target data may be read from a hard disk.

Figure 18:
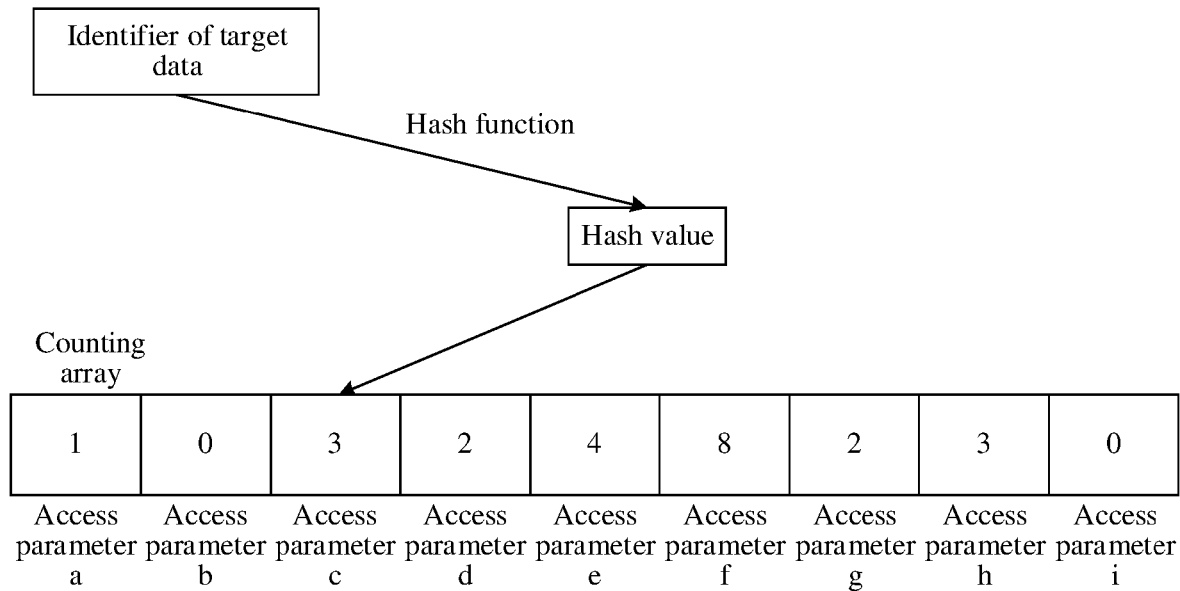
FIG. 18 is a schematic diagram of a structure of a counting array according to this application.

In a possible design, a counting array may be constructed, where each item in the counting array represents an access parameter of corresponding data. When an access parameter of specific data (for example, the target data) needs to be searched for, as shown in FIG. 18, a hash value may be calculated by using an identifier of the target data, and then a corresponding item in the counting array is located by using the hash value, so that the access parameter of the target data can be determined.

For each item in the counting array, when data corresponding to the item is updated, a count auto-increment operation may be performed on the item in the counting array by using a compare-and-swap (remote direct memory access compare and swap, RDMA CAS) mechanism. When invalidation processing or reloading performed on the data copies in the memory of each service node is completed, a count auto-decrement operation is performed on the item in the counting array by using the CAS mechanism.

For example, an initial value of each item in the counting array is zero. When new data content is written into data corresponding to an item in the counting array, 1 is added to the item in the counting array by using the CAS mechanism, and after invalidation processing or reloading performed on data copies of the data is completed, 1 is subtracted from the item in the counting array by using the CAS mechanism. In other words, if the item corresponding to the data in the counting array is not 0, it indicates that caches that are of the data corresponding to the item and that are in the memory of each service node may be invalid; or if the item corresponding to the data in the counting array is 0, it indicates that caches that are of the data corresponding to the item and that are in the memory of each service node is available.

It can be understood that in actual application, in an implementation, the counting array may be stored in each service node in the service system 10, so that when accessing data in the memory, each service node may determine, based on the locally stored counting array, whether caches of the accessed data in the memory are available. In another implementation, the counting array may be stored in a management node in the service system 10. When each service node accesses data in the memory, the service node may first access the management node to determine an access parameter corresponding to the accessed data in the counting array, and then determine, based on the access parameter, whether caches of the accessed data in the memory are available. A storage location of the counting array may not be limited in this embodiment.

In addition, an embodiment further provides a memory management apparatus. The memory management apparatus can be used in a service system, so that the service system implements some or all of the effects in the foregoing embodiments. Specifically, the apparatus may be configured to perform some or all steps in a running process of the service system. For example, the memory management apparatus may be configured to perform some or all of the following steps in FIG. 6, FIG. 10, FIG. 15, and FIG. 16: obtaining a local resource and a global resource through division, adjusting space sizes of the local resource and the global resource, and loading data to a memory, to implement corresponding technical effect.

It can be understood that the memory management apparatus includes corresponding hardware structures and/or software modules for performing functions. A person skill in the art should be easily aware that, in combination with the units and method steps in the examples described in embodiments, the technical solutions provided in embodiments can be implemented by hardware or a combination of hardware and computer software. Whether a function is performed by hardware or by computer software driving hardware depends on particular application scenarios and design constraints of the technical solutions.

In this embodiment, a data access apparatus may be located on a service node in the service system; the data access apparatus may be of a distributed structure, so that functions of the data access apparatus may be jointly implemented by hardware structures and/or software modules of a plurality of service nodes; or functions of the data access apparatus may be implemented by hardware structures and/or software modules that are independent of service nodes in the service system.

Figure 19:
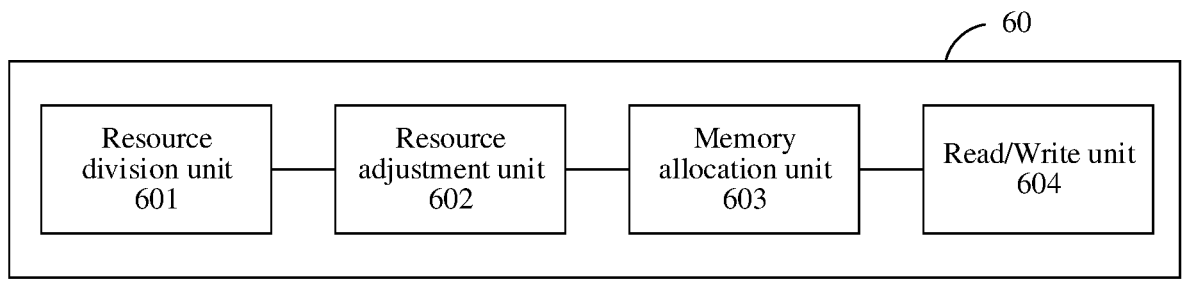
FIG. 19 is a schematic diagram 1 of a structure of a memory management apparatus according to this application.

FIG. 19 is a schematic diagram of a structure of a memory management apparatus according to this application. The memory management apparatus 60 includes a resource division unit 601 and a resource adjustment unit 602.

The resource division unit 601 is configured to divide a memory of at least one of a plurality of service nodes into a local resource and a global resource. For related content of the local resource and the global resource, refer to the foregoing descriptions of each running process in the service system 10. Details are not described herein again.

The resource adjustment unit 602 is configured to adjust storage space sizes of the local resource and the global resource of the at least one service node.

In a possible design, that the resource adjustment unit 602 is configured to adjust storage space sizes of the local resource and the global resource of the at least one service node specifically includes at least one of the following:

when the global resource of the at least one service node is exhausted and the local resource of the at least one service node has free space, transferring the free space in the local resource of the at least one service node to the global resource of the at least one service node;

when the local resource of the at least one service node is exhausted and the global resource of the at least one service node has free space, transferring the free space in the global resource of the at least one service node to the local resource of the at least one service node; or when both the global resource and the local resource of the at least one service node are exhausted, reclaiming a memory resource of lowest value in the memory of the at least one service node, and transferring the reclaimed memory resource to the global resource or transferring the reclaimed memory resource to the local resource.

In a possible design, the resource adjustment unit 602 is further configured to: when adjusting storage space sizes of a local resource and a global resource of each of the at least one service node, keep the storage space size of the local resource of each of the at least one service node not less than a preset threshold.

In a possible design, the memory management apparatus 60 further includes a memory allocation unit 603.

The memory allocation unit 603 is configured to determine, from the local resource or the global resource of the at least one service node based on accessed information of first data, a memory resource for loading the first data.

In a possible design, that the memory allocation unit 603 is configured to determine, from the local resource or the global resource of the at least one service node based on accessed information of first data, a memory resource for loading the first data includes: The memory allocation unit 603 is configured to determine to load the first data to the global resource of the at least one service node if determining, based on the accessed information of the first data, that the first data has been accessed by m service nodes, where m is a positive integer greater than 1, and the m service nodes are included in the plurality of service nodes.

In a possible design, that the memory allocation unit 603 is configured to determine to load the first data to the global resource of the at least one service node if determining, based on the accessed information of the first data, that the first data has been accessed by m service nodes includes: The memory allocation unit 603 is specifically configured to: if determining, based on the accessed information of the first data, that the first data has been accessed by the m service nodes, determine, based on an affinity between the first data and each of the m service nodes, to load the first data to the global resource of the at least one service node.

In a possible design, that the memory allocation unit 603 is configured to determine, from the local resource or the global resource of the at least one service node based on accessed information of first data, a memory resource for loading the first data includes: The memory allocation unit 603 is configured to: if determining, based on the accessed information of the first data, that the first data has been accessed by the at least one service node, determine to load the first data to the local resource of the at least one service node.

In a possible design, that the memory allocation unit 603 is configured to determine, from the local resource or the global resource of the at least one service node based on accessed information of first data, a memory resource for loading the first data includes: The memory allocation unit 603 is specifically configured to: if determining, based on the accessed information of the first data, that the first data has been accessed by m service nodes and an affinity between n service nodes in the m service nodes and the first data is greater than an affinity threshold, determine to load the first data to a local resource of the n service nodes, where m is a positive integer greater than 1, n is a positive integer less than or equal to m, and the m service nodes are included in the plurality of service nodes.

In a possible design, the first data has an access parameter, and the access parameter indicates whether data copies of the first data in memories of the plurality of service nodes are available. The memory management apparatus 60 further includes a read/write unit 604. The read/write unit 604 is configured to obtain a read request for the first data; the read/write unit 604 is further configured to determine the access parameter corresponding to the first data, where the access parameter indicates whether caches that are of the data corresponding to the access parameter and that are in the memories of the plurality of service nodes are available; and the read/write unit 604 is further configured to obtain the first data from the memories of the plurality of service nodes or storage locations in the plurality of service nodes other than the memories based on the access parameter.

In a possible design, the read/write unit 604 is further configured to: when the first data changes, perform a preset operation on the access parameter, so that the access parameter indicates that the caches that are of the data corresponding to the access parameter and that are in the memories of the plurality of service nodes are unavailable.

In a possible design, the read/write unit 604 is further configured to: after cache invalidation or reloading performed on the caches of the first data is completed, perform an inverse operation of the preset operation on the access parameter.

In a possible design, the performing a preset operation on the access parameter includes: performing the preset operation on the access parameter according to a compare-and-swap CAS mechanism.

Figure 20:
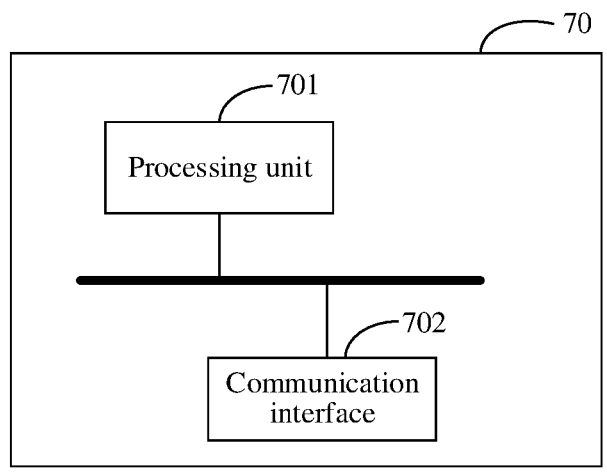
FIG. 20 is a schematic diagram 2 of a structure of a memory management apparatus according to this application.

FIG. 20 is a schematic diagram of a structure of another memory management apparatus according to this application. The memory management apparatus 70 is located in the service node shown in FIG. 1, and is configured to implement the methods provided in this application. Specifically, the memory management apparatus 70 may be a chip or a system on chip. The memory management apparatus 70 may include a processing unit 701 and at least one communication interface 702.

The processing unit 701 is configured to perform the methods provided in embodiments.

Specifically, the processing unit 701 may include a neural network processing unit (neural networks process units, NPU), a tensor processing unit (TPU), a field programmable gate array (FPGA), an application-specific integrated circuit (ASIC), another programmable logic device, a discrete gate, a transistor logic device, a discrete hardware component, or the like.

In some scenarios, for example, when the processing unit 701 includes an NPU, a TPU, or another processor, the processing unit 701 further includes a memory. The processor in the processing unit 701 executes computer executable instructions stored in the memory, to perform the methods provided in this application.

The communication interface 702 is configured to communicate with another apparatus. For example, the memory management apparatus 70 may communicate with another hardware apparatus of the service node through the communication interface 702, to perform the methods provided in embodiments. In an actual application process, the communication interface 702 may be an interface circuit, a transceiver, or the like.

Optionally, the computer executable instructions in this embodiment may also be referred to as application program code. This is not specifically limited in this embodiment.

It should be understood that the memory management apparatus 70 according to this embodiment is configured to implement corresponding procedures of the methods in FIG. 6, FIG. 10, FIG. 15, and FIG. 16. For brevity, details are not described herein again.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer programs or instructions. When the computer programs or instructions are loaded and executed on a computer, all or some of the procedures or functions according to embodiments are executed. The computer may be a general-purpose computer, a dedicated computer, a computer network, a network device, user equipment, or another programmable apparatus. The computer programs or instructions may be stored in a computer-readable storage medium or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible to a computer, or a data storage device, for example, a server or a data center, integrating one or more usable media. The usable medium may be a magnetic medium, for example, a floppy disk, a hard disk, or a magnetic tape; may be an optical medium, for example, a digital video disc (DVD); or may be a semiconductor medium, for example, an SSD.

In embodiments, unless otherwise stated or there is a logical conflict, terms and/or descriptions between different implementations are consistent and can be mutually referenced, and technical features in different embodiments can be combined into a new embodiment based on an inner logical relationship between the technical features.

In embodiments, "at least one" means one or more, "a plurality of" means two or more, and other quantifiers are similar. A term "and/or" describes an association relationship for describing associated objects and represents that three relationships may exist. For example, A and/or B may represent the following three cases: Only A exists, both A and B exist, and only B exists. In addition, an element (element) that appears in singular forms "a", "an", and "the" does not mean "one or only one" unless otherwise specified in a context, but means "one or more". For example, "a device" means one or more such devices. Furthermore, "at least one of (at least one of) . . . " means one or any combination of subsequent associated objects. For example, "at least one of A, B, and C" includes A, B, C, AB, AC, BC, or ABC. In text descriptions of embodiments, a character "/" generally indicates an "or" relationship between associated objects. In a formula in embodiments, a character "/" indicates a "division" relationship between associated objects.

What is claimed is:

1. A service system, comprising:
    a plurality of service nodes, wherein a memory of a first service node of the plurality of service nodes is divided into a local resource and a global resource;
    wherein the local resource provides memory storage space for the first service node, the global resource is comprised in a memory pool, and the memory pool provides memory storage space for the plurality of service nodes; and
    wherein when a specific condition is satisfied, at least a part of space in the local resource is transferred to the memory pool, or at least a part of space in the memory pool is transferred to the local resource.

2. The service system according to claim 1, further comprising:
    a memory management apparatus, configured to adjust storage space sizes of the local resource and the global resource of the first service node.

3. The service system according to claim 2, wherein the memory management apparatus is configured to:
    when the global resource is exhausted and the local resource has free space, transfer the free space in the local resource to the global resource; and
    when the local resource is exhausted and the global resource has free space, transfer the free space in the global resource to the local resource.

4. The service system according to claim 2, wherein the memory management apparatus is further configured to:
    when adjusting storage space sizes of the local resource and the global resource of the first service node, keep the storage space size of the local resource not less than a preset threshold.

5. The service system according to claim 1, further comprising:
    a memory management apparatus, configured to determine, from the local resource or the global resource on accessed information of first data, a memory resource for loading the first data.

6. The service system according to claim 5, wherein the memory management apparatus is configured to:
    determine to load the first data to the global resource when it is determined based on the accessed information of the first data, that the first data has been accessed by m service nodes, wherein m is a positive integer greater than 1, and the m service nodes are comprised in the plurality of service nodes.

7. The service system according to claim 6, wherein the memory management apparatus is configured to:
    when it is determined, based on the accessed information of the first data, that the first data has been accessed by the m service nodes, determine, based on an affinity between the first data and each of the m service nodes, to load the first data to the global resource.

8. The service system according to claim 5, wherein the memory management apparatus is configured to:
    when it is determined, based on the accessed information of the first data, that the first data has been accessed by only the first service node, determine to load the first data to the local resource.

9. The service system according to claim 5, wherein the memory management apparatus is configured to:
    when it is determined, based on the accessed information of the first data, that the first data has been accessed by m service nodes, and an affinity between n service nodes in the m service nodes and the first data is greater than an affinity threshold, determine to load the first data to a local resource of the n service nodes, wherein m is a positive integer greater than 1, n is a positive integer less than or equal to m, and the m service nodes are comprised in the plurality of service nodes.

10. The service system according to claim 5, wherein the first data has an access parameter, and the access parameter indicates whether data copies of the first data in memories of the plurality of service nodes are available.

11. The service system according to claim 1, wherein the plurality of service nodes further comprises a second service node, wherein a memory of the second service node is divided into a another local resource and another global resource; and wherein the another local resource of the second service node provides memory storage space for the second service node, and the another global resource of the second service node is comprised in the memory pool that provides memory storage space for the plurality of service nodes.

12. The service system according to claim 11, further comprising:

a memory management apparatus, configured to adjust storage space sizes of the local resource and the global resource of the first service node and the another global resource and the another local resource of the second service node.

13. The service system according to claim 12, wherein the memory management apparatus is configured to:

when the global resource of the first service node or the another global resource of the second service node is exhausted and the local resource of the first service node or the another local resource of the second service node has free space, transfer the free space to the global resource of the first service node or the another global resource of the second service node; and when the local resource of the first service node or the another local resource of the second service node is exhausted and the global resource of the first service node or the another global resource of the second service node has free space, transfer the free space to the local resource of the first service node or the another local resource of the second service node.

14. The service system according to claim 1, wherein a memory of each service node of the plurality of service nodes is divided into a respective local resource and a respective global resource.

15. A method, applied to a service system, the service system comprising a plurality of service nodes, and the method comprising:

dividing a memory of a first service node of the plurality of service nodes into a local resource and a global resource, wherein the local resource provides memory storage space for the first service node, the global resource is comprised in a memory pool, the memory pool provides memory storage space for the plurality of service nodes, and when a specific condition is satisfied, at least a part of space in the local resource is transferred to the memory pool, or at least a part of space in the memory pool is transferred to the local resource; and adjusting storage space sizes of the local resource and the global resource.

16. The method according to claim 15, wherein adjusting the storage space sizes of the local resource and the global resource comprises at least one of the following:

when the global resource is exhausted and the local resource has free space, transferring the free space in the local resource to the global resource; or when the local resource is exhausted and the global resource has free space, transferring the free space in the global resource to the local resource.

17. The method according to claim 16, comprising:

when storage space sizes of the local resource and the global resource are adjusted, keeping the storage space size of the local resource not less than a preset threshold.

18. The method according to claim 15, further comprising:

determining, from the local resource or the global resource based on accessed information of first data, a memory resource for loading the first data.

19. The method according to claim 18, wherein determining, from the local resource or the global resource based on accessed information of the first data, the memory resource for loading the first data comprises:

determining to load the first data to the global resource when it is determined, based on the accessed information of the first data, that the first data has been accessed by m service nodes, wherein m is a positive integer greater than 1, and the m service nodes are comprised in the plurality of service nodes.

20. The method according to claim 15, wherein dividing the memory of the first service node of the plurality of service nodes into the local resource and the global resource comprises:

dividing the memory of each service node of the plurality of service nodes into a respective local resource and a respective global resource.

* * * * *